US012659355B2

(12) United States Patent
Parla et al.

(10) Patent No.:    US 12,659,355 B2
(45) Date of Patent:        Jun. 16, 2026

(54) ADAPTIVE POLICY GENERATION IN DISTRIBUTED SECURITY FABRICS

(71) Applicant: Cisco Technology, Inc., San Jose, CA (US)

(72) Inventors: Vincent Parla, North Hampton, NH (US); Eric Maximilian Roquemore, Austin, TX (US); John Michael Lake, Cary, NC (US); Andrew Zawadowskiy, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/752,049

(22) Filed: Jun. 24, 2024

(65) Prior Publication Data

US 2025/0039239 A1      Jan. 30, 2025

Related U.S. Application Data

(60) Provisional application No. 63/635,573, filed on Apr. 17, 2024, provisional application No. 63/516,448, filed on Jul. 28, 2023.

(51) Int. Cl.
*H04L 9/40*                (2022.01)
(52) U.S. Cl.
CPC .......... *H04L 63/20* (2013.01); *H04L 63/1425* (2013.01)
(58) Field of Classification Search
CPC .. H04L 63/20; H04L 63/1425; H04L 63/0263
See application file for complete search history.

(56) References Cited

U.S. PATENT DOCUMENTS

| | | | | |
|---|---|---|---|---|
| 8,196,125 B2 * | 6/2012 | Maes | .................... | G06Q 10/06 |
| | | | | 717/154 |
| 10,666,514 B2 * | 5/2020 | Burke | ................. | H04L 41/0894 |
| 2003/0027551 A1 * | 2/2003 | Rockwell | ......... | B64D 11/00155 |
| | | | | 455/410 |

(Continued)

OTHER PUBLICATIONS

Sicari et al., "Dynamic Policies in Internet of Things: Enforcement and Synchronization", Sep. 2017, IEEE Internet of Things Journal, vol. 4, No. 6, pp. 2228-2238 (Year: 2017).*

*Primary Examiner* — Kenneth W Chang
(74) *Attorney, Agent, or Firm* — Polsinelli P.C.

(57)                ABSTRACT

A system and method are provided for placing security operations at selected enforcement points in a distributed security fabric. The enforcement points at which the security operations are placed can be endpoints, nodes, and/or network devices within the network. The security operations can be updated by monitoring data flows through the network to generate network data, and then determining, based on the network data, one or more changes to the security operations, based on the generated network data. Recommended changes can be obtained by applying the network data to a machine-learning model that indicates suspicious data packets (e.g., disseminates packets suspected of being malicious from normal traffic) and crafts new policies to deny the suspicious data packets. Performance of the network can also be improved by analyzing the security operations for redundancies and/or inefficiencies and modifying the security operations to mitigate them.

20 Claims, 13 Drawing Sheets

(56)                References Cited

U.S. PATENT DOCUMENTS

| | | | |
|---|---|---|---|
| 2012/0023546 A1* | 1/2012 | Kartha | H04L 63/104 |
| | | | 726/1 |
| 2015/0304354 A1* | 10/2015 | Rogers | H04L 63/20 |
| | | | 726/1 |
| 2017/0048107 A1* | 2/2017 | Dosovitsky | H04L 41/0816 |
| 2017/0250875 A1 | 8/2017 | Jensen et al. | |
| 2018/0026856 A1* | 1/2018 | Yang | H04L 41/5019 |
| | | | 709/224 |
| 2018/0063085 A1 | 3/2018 | Shanks et al. | |
| 2019/0028552 A1* | 1/2019 | Johnson, II | H04L 67/146 |
| 2019/0036776 A1* | 1/2019 | Smith | H04L 41/28 |
| 2019/0364063 A1* | 11/2019 | Lee | G06F 21/566 |
| 2020/0067980 A1 | 2/2020 | Livny et al. | |
| 2020/0106806 A1* | 4/2020 | Gupta | H04L 61/4511 |
| 2020/0228538 A1* | 7/2020 | Soule | H04L 63/105 |
| 2020/0296172 A1* | 9/2020 | Gunjal | G06N 3/0442 |
| 2021/0314388 A1* | 10/2021 | Zhou | H04L 61/103 |
| 2022/0166756 A1 | 5/2022 | Gupta et al. | |
| 2023/0179572 A1 | 6/2023 | Kambi Ravi et al. | |

* cited by examiner

| action | src | port | dest | port | protocol |
|--------|-----|------|------|------|----------|
| allow | 0.2.1.0/24 | • | 8.8.8.88/24 | 53 | |
| block | • | • | • | 53 | |
| allow | • | • | • | 53 | UDP |
| allow | 8.8.8.88/24 | 123 | 0.2.3.1/32 | 123 | UDP |
| block | • | • | • | 69 | UDP |
| block | • | • | • | 87 | |
| block | • | • | • | 111 | |
| block | • | • | • | 111 | UDP |
| block | • | • | • | 2049 | UDP |
| block | • | • | • | 2049 | |
| block | • | • | • | 512 | TCP |
| block | • | • | • | 513 | |
| block | • | • | • | 514 | TCP |
| block | • | • | • | 515 | |
| block | • | • | • | 540 | |
| block | • | • | • | 6000-6100 | |
| allow | • | • | 8.8.8.8/24 | 443 | |
| block | • | • | 8.8.8.8/24 | • | |
| block | 0.2.1.1/24 | • | • | • | |
| block | 0.2.1.1/24 | • | • | • | UDP |
| allow | • | • | • | • | |
| block | • | • | • | • | UDP |

FIG. 2

ADAPTIVE POLICY GENERATION IN DISTRIBUTED SECURITY FABRICS

CROSS-REFERENCE TO RELATED APPLICATIONS

This application priority to U.S. provisional application No. 63/635,573, titled "Adaptive Policy Generation in Distributed Firewalls," filed on Apr. 17, 2024, as well as U.S. provisional application No. 63/516,448, titled "Data Processing Units (DPUs) and extended Berkley Packet Filters (eBPFs) for Improved Security," filed on Jul. 28, 2023, which is expressly incorporated by reference herein in its entirety.

BACKGROUND

A firewall is a network security system that monitors and controls incoming and outgoing network traffic based on predetermined security rules. A firewall typically establishes a barrier between a trusted network and an untrusted network, such as the Internet. A single point of protection against malicious software is not necessarily optimal and is not always feasible.

A distributed firewall can be used to augment and supplement a traditional single-point firewall. A distributed firewall can include a security application on a host machine of a network that protects the servers and user machines of its enterprise's networks against unwanted intrusion. A firewall is a system or group of systems (router, proxy, or gateway) that implements a set of security rules to enforce access control between two networks to protect the trusted network from the untrusted network. The system or group of systems filter all traffic regardless of its origin—the Internet or the internal network. The distributed firewall can be deployed behind a traditional firewall to provide a second layer of defense. The advantages of the distributed firewall allow security rules (policies) to be defined and pushed out on an enterprise-wide basis, which is beneficial for larger enterprises.

Distributed firewalls can be implemented using kernel-mode applications that sit at the bottom of the OSI stack in the operating system. Further, distributed firewalls can filter all traffic regardless of its origin (e.g., from the untrusted network or the trusted network, such as from the Internet or the internal network). For example, distributed firewalls can treat both the Internet and the internal network as "unfriendly". Thus, distributed firewalls can guard the individual machine in the same way that the perimeter firewall guards the overall network.

For example, distributed-firewall functions can be implemented using (i) a policy language that states what sort of connections are permitted or prohibited, (ii) system management tools, such as a Systems Management Server (SMS) or ASD, and (iii) Internet Protocol Security (IPsec), which provides network-level encryption mechanism for Internet protocols (e.g., TCP, UDP, etc.). A compiler can translate the policy language into an internal format. The system management software distributes this policy file to all hosts that are protected by the firewall, and incoming packets are accepted or rejected by each "inside" host, according to both the policy and the cryptographically verified identity of each sender.

In another example, a distributed firewall can be a hardware-assisted firewall that supplements—without replacing—other security features in the Cisco Application Centric Infrastructure (ACI) fabric such as CISCO Adaptive Security Virtual Appliance (ASAv) or secure zones created by micro-segmentation with CISCO ACI Virtual Edge. The distributed firewall can provide dynamic packet filtering, e.g., by tracking the state of TCP and FTP connections and blocking packets unless they match a known active connection. Traffic from the Internet and the internal network can be filtered based on policies that can be configured in the APIC GUI. The distributed firewall can be distributed within the network by, e.g., tracking connections even when virtual machines (VMs) are moved to other servers. The distributed firewall can prevent SYN-ACK attacks. For example, when a provider VM initiates SYN-ACK packets, the distributed firewall on the provider, CISCO ACI Virtual Edge can drop these packets because no corresponding flow (connection) is created. The distributed firewall can support TCP flow aging.

Improved systems and methods are desired for adaptively selecting and placing of security policies within distributed security fabrics, systems, and firewalls.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example of 5-tuple rules, in accordance with one embodiment.

DESCRIPTION OF EXAMPLE EMBODIMENTS

Figure 1:
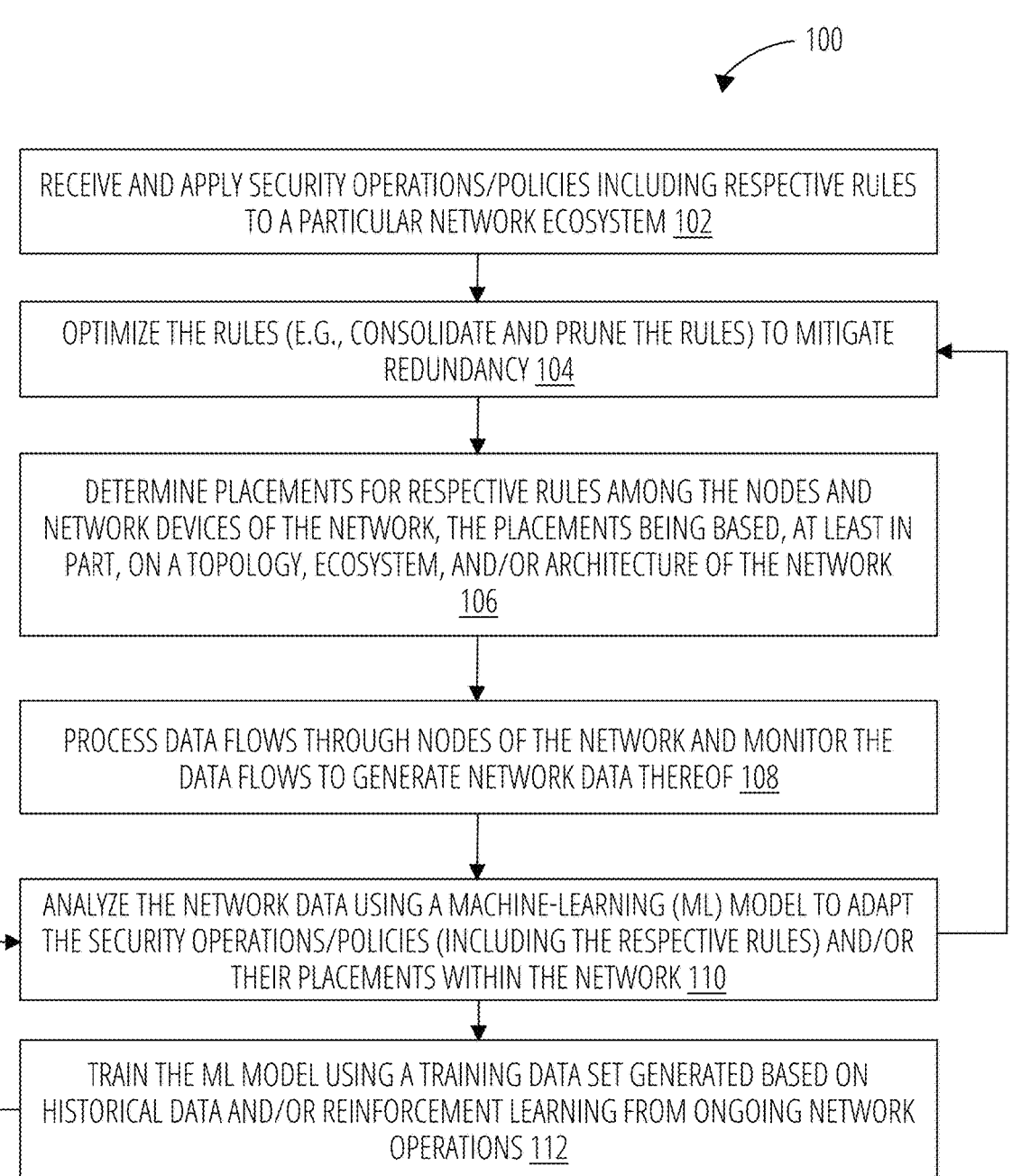
FIG. 1 illustrates a method for selecting locations within a network at which to place security operations, in accordance with one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some aspects, the techniques described herein relate to a method of optimizing a distributed security fabric, the method including: receiving, at a controller, respective security policies being implemented in a network including enforcement points at respective nodes within the network; determining, by the controller, selected enforcement points within the network at which the respective security policies are applied; and sending, to the selected enforcement points, instructions to apply the security policies at the selected enforcement points, respectively, wherein the selected enforcement points are determined based on an estimated flow cost representing an aggregation of consumed resources at the selected enforcement points that is determined based on a topology of the network.

In some aspects, the techniques described herein relate to a method, wherein the selected enforcement points are selected from firewall enforcement points within a distributed firewall and security hook enforcement points applied at one or more endpoints of the network.

In some aspects, the techniques described herein relate to a method, wherein the estimated flow cost is an objective function that accounts for changes in an amount of computational resources used to apply the security policies resulting from how the security policies are segmented and where the security policies are placed within the network.

In some aspects, the techniques described herein relate to a method, further including: monitoring data flows through the network to generate network data; determining, based on the network data, one or more changes to the security policies; and modifying the security policies in accordance with the one or more changes;

In some aspects, the techniques described herein relate to a method, wherein the one or more changes include detecting a part of the network that is over protected, detecting a part of the network that is under protected, detecting a change in a data flow pattern, or detecting a change in a workload.

In some aspects, the techniques described herein relate to a method, wherein determining the one or more changes to the security policies further includes: applying the network data to a machine-learning model to output recommended changes.

In some aspects, the techniques described herein relate to a method, wherein: the recommended changes respectively include corresponding scores, for a score that corresponds to a recommended change, the recommended change is implemented automatically when the score is in a first range, when the score is in a second range, the recommended change is signaled to an authorized user to be implemented manually, when the authorized user takes an action with respect to the recommended change, the action is used to label the recommended change to generate labeled training data that is added to a training data set, and the machine-learning model is trained using the training data set for reinforcement learning.

In some aspects, the techniques described herein relate to a method, wherein the machine-learning model is an unsupervised learning model that groups data packets of the data flows into clusters and identifies data packets outside the clusters as suspicious.

In some aspects, the techniques described herein relate to a method, wherein the unsupervised learning model that is a clustering model.

In some aspects, the techniques described herein relate to a method, wherein the machine-learning model predicts suspicious packets from the network data and determines the one or more changes to the security policies based on the suspicious packets.

In some aspects, the techniques described herein relate to a method, wherein: the machine-learning model is a generative adversarial network model that includes a generator model and a discriminator model, the generator model is trained to generate data packets that are consistent with allowed packets, the discriminator model is trained to discriminate the allowed packets from not allowed packets, and ingress packets that are detected by the discriminator model as the not allowed packets are flagged as suspicious packets and used for the determining of the one or more changes to the security policies, the machine-learning model is a latent variable model that determines the suspicious packets based on a distance measure between an input packet and output packet, wherein the output packet is generated by applying the input packet to the latent variable model, or the machine-learning model is a transformer model that determines the suspicious packets by predicting, based on the network data, whether a data packet is suspicious.

In some aspects, the techniques described herein relate to a method, further including: analyzing the security policies to determine redundancies and/or inefficiencies among the security policies; modifying the security policies to mitigate the redundancies and/or the inefficiencies; and validating the security policies to confirm that the modifying of the security policies maintains an effectiveness of the security policies.

In some aspects, the techniques described herein relate to a method, wherein the security policies include 5-tuple rules dictating actions taken on a data packet based on a 5-tuple that includes a source address of the data packet, a source port of the data packet, a destination address of the data packet, a destination port of the data packet, and a protocol of the data packet.

In some aspects, the techniques described herein relate to a method, wherein the security policies further include IPS signature detection, deep packet inspection, authentication, an access list, HTTP or HTTPS filtering, or an advanced inspection and prevention security operation module.

In some aspects, the techniques described herein relate to a method, wherein the security policies are applied in data planes of network devices at the selected enforcement points include nodes in the network, and the network devices include a switch, a data processing unit (DPU), a Berkley packet filter (BPF), and/or an extended BPF (eBPF).

In some aspects, the techniques described herein relate to a computing apparatus including: a processor; and a memory storing instructions that, when executed by the processor, configure the apparatus to: receive, at a controller, security policies being implemented in a network; determine, by the controller, selected enforcement points within the network where the security policies are applied; and send, to the selected enforcement points, instructions to apply the security policies at the selected enforcement points, respectively, wherein the selected enforcement points are determined based on an estimated flow cost representing an aggregation of consumed resources at the selected enforcement points that is determined based on a topology of the network.

In some aspects, the techniques described herein relate to a computing apparatus including: a processor; and a memory storing instructions that, when executed by the processor, configure the computing apparatus to: receive, at a controller, security policies being implemented in a network including enforcement points at respective nodes within the network; determine, by the controller, selected enforcement points within the network at which the respective security policies are applied; and send, to the selected enforcement points, instructions to apply the security policies at the selected enforcement points, respectively, wherein the selected enforcement points are determined based on an estimated flow cost representing an aggregation of consumed resources at the selected enforcement points that is determined based on a topology of the network.

In some aspects, the techniques described herein relate to a computing apparatus, wherein the selected enforcement points are selected from firewall enforcement points within a distributed firewall and security hook enforcement points applied at one or more endpoints of the network.

In some aspects, the techniques described herein relate to a computing apparatus, wherein the estimated flow cost is an objective function that accounts for changes in an amount of computational resources used to apply the security policies resulting from how the security policies are segmented and where the security policies are placed within the network.

In some aspects, the techniques described herein relate to a computing apparatus, wherein, when executed by the processor, the instructions that are stored in the memory further configure the apparatus to: monitor data flows through the network to generate network data; determine, based on the network data, one or more changes to the security policies; and modify the security policies in accordance with the one or more changes.

In some aspects, the techniques described herein relate to a computing apparatus, wherein the one or more changes include detecting a part of the network that is over protected, detecting a part of the network that is under protected, detecting a change in a data flow pattern, or detecting a change in a workload.

In some aspects, the techniques described herein relate to a computing apparatus, wherein, when executed by the processor, the instructions determine the one or more changes to the security policies by further configuring the apparatus to: apply the network data to a machine-learning model to output recommended changes.

In some aspects, the techniques described herein relate to a computing apparatus, wherein the recommended changes respectively include corresponding scores, for a score that corresponds to a recommended change, the recommended change is implemented automatically when the score is in a first range, when the score is in a second range, the recommended change is signaled to an authorized user to be implemented manually, when the authorized user takes an action with respect to the recommended change, the action is used to label the recommended change to generate labeled training data that is added to a training data set, and the machine-learning model is trained using the training data set for reinforcement learning.

In some aspects, the techniques described herein relate to a computing apparatus, wherein the machine-learning model is an unsupervised learning model that groups data packets of the data flows into clusters and identifies data packets outside the clusters as suspicious.

In some aspects, the techniques described herein relate to a computing apparatus, wherein the unsupervised learning model that is a clustering model.

In some aspects, the techniques described herein relate to a computing apparatus, wherein the machine-learning model predicts suspicious packets from the network data and determines the one or more changes to the security policies based on the suspicious packets.

In some aspects, the techniques described herein relate to a computing apparatus, wherein the machine-learning model is a generative adversarial network model that includes a generator model and a discriminator model, the generator model being trained to generate data packets that are consistent with allowed packets, the discriminator model being trained to discriminate the allowed packets from not allowed packets, and ingress packets that are detected by the discriminator model as the not allowed packets are flagged as suspicious packets and used for the determining of the one or more changes to the security policies, the machine-learning model is a latent variable model that determines the suspicious packets based on a distance measure between an input packet and output packet, wherein the output packet is generated by applying the input packet to the latent variable model, or the machine-learning model is a transformer model that determines the suspicious packets by predicting, based on the network data, whether a data packet is suspicious.

In some aspects, the techniques described herein relate to a computing apparatus, wherein, when executed by the processor, the instructions that are stored in the memory further configure the apparatus to: analyze the security policies to determine redundancies and/or inefficiencies among the security policies; modify the security policies to mitigate the redundancies and/or the inefficiencies; and validate the security policies to confirm that the modifying of the security policies maintains an effectiveness of the security policies.

In some aspects, the techniques described herein relate to a computing apparatus, wherein the security policies include 5-tuple rules dictating actions taken on a data packet based on a 5-tuple that includes a source address of the data packet, a source port of the data packet, a destination address of the data packet, a destination port of the data packet, and a protocol of the data packet.

In some aspects, the techniques described herein relate to a computing apparatus, wherein the security policies further include IPS signature detection, deep packet inspection, authentication, an access list, HTTP or HTTPS filtering, or an advanced inspection and prevention security operation module.

In some aspects, the techniques described herein relate to a computing apparatus, wherein the security policies are applied in data planes of network devices at the selected enforcement points include nodes in the network, and the network devices include a switch, a data processing unit (DPU), a Berkley packet filter (BPF), and/or an extended BPF (eBPF).

In some aspects, the techniques described herein relate to a non-transitory computer-readable storage medium including instructions that when executed by a computer, cause the computer to: receive, at a controller, security policies being implemented in a network; determine, by the controller, selected enforcement points within the network where the security policies are applied; and send, to the selected enforcement points, instructions to apply the security policies at the selected enforcement points, respectively, wherein the selected enforcement points are determined based on an estimated flow cost represent an aggregation of consumed resources at the selected enforcement points that is determined based on a topology of the network.

In some aspects, the techniques described herein relate to a non-transitory computer-readable storage medium, the computer-readable storage medium including instructions that when executed by a computer, cause the computer to: receive, at a controller, security policies being implemented in a network; determine, by the controller, selected enforcement points within the network where the security policies are applied; and send, to the selected enforcement points, instructions to apply the security policies at the selected enforcement points, respectively, wherein the selected enforcement points are determined based on an estimated flow cost represent an aggregation of consumed resources at the selected enforcement points that is determined based on a topology of the network.

In some aspects, the techniques described herein relate to a non-transitory computer-readable storage medium, wherein the estimated flow cost is an objective function that accounts for changes in an amount of computational resources used to apply the security policies resulting from how the security policies are segmented and where the security policies are placed within the network.

In some aspects, the techniques described herein relate to a non-transitory computer-readable storage medium, wherein, when executed by the computer, the instructions cause the computer to: monitor data flows through the network to generate network data; determine, based on the network data, one or more changes to the security policies; and modify the security policies in accordance with the one or more changes.

In some aspects, the techniques described herein relate to a non-transitory computer-readable storage medium, wherein the one or more changes include detecting a part of the network that is over protected, detecting a part of the network that is under protected, detecting a change in a data flow pattern, or detecting a change in a workload.

In some aspects, the techniques described herein relate to a non-transitory computer-readable storage medium, wherein, when executed by the computer, the instructions determine the one or more changes to the security policies by further causing the computer to: apply the network data to a machine-learning model to output recommended changes.

In some aspects, the techniques described herein relate to a non-transitory computer-readable storage medium, wherein the recommended changes respectively include corresponding scores, for a score that corresponds to a recommended change, the recommended change is implemented automatically when the score is in a first range, when the score is in a second range, the recommended change is signaled to an authorized user to be implemented manually, when the authorized user takes an action with respect to the recommended change, the action is used to label the recommended change to generate labeled training data that is added to a training data set, and the machine-learning model is trained using the training data set for reinforcement learning.

In some aspects, the techniques described herein relate to a non-transitory computer-readable storage medium, wherein the machine-learning model is an unsupervised learning model that groups data packets of the data flows into clusters and identifies data packets outside the clusters as suspicious.

In some aspects, the techniques described herein relate to a non-transitory computer-readable storage medium, wherein the unsupervised learning model that is a clustering model.

In some aspects, the techniques described herein relate to a non-transitory computer-readable storage medium, wherein the machine-learning model predicts suspicious packets from the network data and determines the one or more changes to the security policies based on the suspicious packets.

In some aspects, the techniques described herein relate to a non-transitory computer-readable storage medium, wherein the machine-learning model is a generative adversarial network model that includes a generator model and a discriminator model, the generator model being trained to generate data packets that are consistent with allowed packets, the discriminator model being trained to discriminate the allowed packets from not allowed packets, and ingress packets that are detected by the discriminator model as the not allowed packets are flagged as suspicious packets and used for the determining of the one or more changes to the security policies, the machine-learning model is a latent variable model that determines the suspicious packets based on a distance measure between an input packet and output packet, wherein the output packet is generated by applying the input packet to the latent variable model, or the machine-learning model is a transformer model that determines the suspicious packets by predicting, based on the network data, whether a data packet is suspicious.

In some aspects, the techniques described herein relate to a non-transitory computer-readable storage medium, when executed by the processor, the instructions that are stored in the memory further configure the processor to: analyze the security policies to determine redundancies and/or inefficiencies among the security policies; modify the security policies to mitigate the redundancies and/or the inefficiencies; and validate the security policies to confirm that the modifying of the security policies maintains an effectiveness of the security policies.

In some aspects, the techniques described herein relate to a non-transitory computer-readable storage medium, wherein the security policies include 5-tuple rules dictating actions taken on a data packet based on a 5-tuple that includes a source address of the data packet, a source port of the data packet, a destination address of the data packet, a destination port of the data packet, and a protocol of the data packet.

In some aspects, the techniques described herein relate to a non-transitory computer-readable storage medium, wherein the security policies further include IPS signature detection, deep packet inspection, authentication, an access list, HTTP or HTTPS filtering, or an advanced inspection and prevention security operation module.

In some aspects, the techniques described herein relate to a non-transitory computer-readable storage medium, wherein the security policies are applied in data planes of network devices at the selected enforcement points include nodes in the network, and the network devices include a switch, a data processing unit (DPU), a Berkley packet filter (BPF), and/or an extended BPF (eBPF).

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for adaptively selecting and placing security policies/services within distributed security systems and firewalls.

Whereas previous firewalls and security appliances are located at a single location, are static, and have rules that are manually updated, the systems and methods disclosed herein provide improvements over previous firewalls and security appliances by providing (i) multiple possible locations to apply the security operations of the firewalls and security appliances (e.g., security policies and/or security operations); (ii) optimization of where the security operations are placed within the network; (iii) automation for updating the security operations; and (iv) training a machine learning model to determine the updates to the security operations.

Because traditional firewalls have manually updated rules it can be labor intensive to maintain the security of the firewalls in view of ever-evolving threats. Additionally, traditional firewalls suffer from the fact that they are often located at one point (e.g., the boundary between a secure network and an insecure network). Consequently, traditional firewalls have limited utility in protecting against attacks based on east-west traffic.

For example, firewalls in traditional enterprises generally provide a single, fixed policy set (e.g., a fixed collection of firewall rules). If the security operations center (SOC) is concerned with preventing a particular exploit that only affects one of several workloads but the firewall is located at a single enforcement point at the edge of the network, then the SOC can be constrained to apply the specific rule(s) addressing the particular exploit to all data flows through the enforcement point, rather than just applying the specific rule(s) to the subset of data flows at the one of several workloads, which would be more efficient.

According to certain non-limiting examples, the systems and methods disclosed herein address the above-noted challenges by introducing a dynamic and self-optimizing approach to security rule management (e.g., firewall rules/policies and LSM hook security enforcement). In contrast to traditional firewalls that are static and have manually updated rules, the systems and methods disclosed herein leverage historic and real-time traffic data to generate, refine, and optimize firewall rules for distributed firewalls. For example, historical data can be used to train machine learning (ML) models to detect and flag unusual/surprising events. Further, ongoing and/or reinforcement learning can be used to maintain the distributed firewall to be up to date with respect to evolving threats.

According to certain non-limiting examples, the systems and methods disclosed herein use a dynamic and self-optimizing approach to firewall rule management. As opposed to static and manually updated rules, the system leverages historic and real-time network data, which represents the flow of the data traffic, to generate, refine, and optimize firewall rules. By analyzing data across a multi-node system, policies can adapt to emerging threat patterns ensuring rules are relevant and optimized for the current data traffic.

FIG. 1 illustrates an example method 100 for adaptively selecting and placing security policies/services within distributed security fabrics (e.g., firewalls and endpoint security enforcement). Although the example method 100 depicts a particular sequence of operations, the sequence may be altered without departing from the scope of the present disclosure. For example, some of the operations depicted may be performed in parallel or in a different sequence that does not materially affect the function of method 100. In other examples, different components of an example device or system that implements method 100 may perform functions at substantially the same time or in a specific sequence.

According to some examples, in step 102, the method includes receiving and applying security operations including respective rules and policies. More particularly, these security operations are applied to a particular network ecosystem. The term "security operations" includes at least rules and policies such as firewall policies based on 5-tuples. The term "security operations" can include other security services, as discussed below. Further, the term "security operations" includes security operations enforced using LSM BPF and LSM hooks, as described below with reference to FIG. 7C.

According to certain non-limiting examples, the security operations can include 5-tuple rules that indicate actions taken on a data packet based on a 5-tuple, as illustrated in FIG. 2. The 5-tuples each include a source address of the data packet, a source port of the data packet, a destination address of the data packet, a destination port of the data packet, and a protocol of the data packet (e.g., transmission control protocol (TCP) or user datagram protocol (UDP)).

Additionally or alternatively, security operations can include intrusion prevention system (IPS) signature detection, deep packet inspection (DPI), authentication, an access control list, hypertext transfer protocol (HTTP) or hypertext transfer protocol secure (HTTPS) filtering, or an advanced inspection and prevention security services module. For example, the security operations that are placed at a firewall/enforcement point (e.g., a node or network device in the networks) can determine which traffic is allowed to pass through the enforcement point firewall/enforcement point. For example, a enforcement point, a firewall, or a security appliance can default to allowing traffic to flow freely from an inside network (higher security level) to an outside network (lower security level). By modifying the actions applied to the traffic, the security policy can be customized.

For example, traffic can be permitted or denied based on access lists. For example, applying an access list can be used to limit traffic from inside to outside, or allow traffic from outside to inside.

Further, security operations can use network address translation (NAT). For example, NAT can enable using private addresses, which are not routable on the Internet, on your inside networks. NAT can be used to hide the local addresses from other networks, so attackers cannot learn the real address of a host. NAT can be used to resolve IP routing problems by supporting overlapping IP addresses.

According to certain non-limiting examples, the security operations can use authentication and/or authorization for certain types of traffic, e.g., for HTTP. Further, a security appliance can also send accounting information to an authentication, authorization, and accounting (AAA) server (e.g., Remote Authentication Dial-In User Service (RA-DIUS) server or a Terminal Access Controller Access Control System Plus (TACACS+) server).

According to certain non-limiting examples, the security operations can use access lists to prevent outbound access to specific websites or FTP servers, configuring and managing web usage this way is not practical because of the size and dynamic nature of the Internet.

According to certain non-limiting examples, the security operations can send traffic to the advanced inspection and prevention security services module (AIP SSM) for inspection.

According to certain non-limiting examples, the security operations can use application inspection engines for protocols that embed IP addressing information in the user data packet or that open secondary channels on dynamically assigned ports. These protocols can be used together with deep packet inspection (DPI).

According to certain non-limiting examples, the security operations can use a content security and control security services module (CSC SS) to provide protection against viruses, spyware, spam, and other unwanted traffic, e.g., by scanning the FTP, HTTP, POP3, and SMTP traffic.

According to certain non-limiting examples, the security operations can include applying quality of service (QOS) policies. For example, some network traffic, such as voice and streaming video, cannot tolerate long latency times. QoS is a network feature that gives priority to these types of traffic. QoS refers to the capability of a network to provide better service to selected network traffic.

According to certain non-limiting examples, the security operations can limit TCP and UDP connections and embryonic connections. Limiting the number of connections and embryonic connections protects you from a denial of services (DOS) attack. For example, the security operations c can use the embryonic limit to trigger TCP Intercept, which protects inside systems from a DOS attack perpetrated by flooding an interface with TCP SYN packets. An embryonic connection is a connection request that has not finished the necessary handshake between source and destination. TCP normalization can be used as a feature consisting of advanced TCP connection settings designed to drop packets that do not appear normal.

According to certain non-limiting examples, the security operations can perform scanning threat detection and basic threat detection, and the security operations can also use statistics to analyze threats. For example, threat detection can detect activity that might be related to an attack, such as a DOS attack, and automatically sends a system log message. Additionally or alternatively, a scanning attack can include a host that tests the accessibility of every IP address in a subnet (by scanning through many hosts in the subnet or sweeping through many ports in a host or subnet). The scanning threat detection feature determines when a host is performing a scan. Unlike IPS scan detection (which can be based on traffic signatures), the scanning threat detection feature can maintain an extensive database that contains host statistics that can be analyzed for scanning activity. Additionally or alternatively, the host database can track suspicious activity such as connections with no return activity, access of closed service ports, vulnerable TCP behaviors such as non-random Internet protocol identification (IPID), etc.

According to some examples, in step 104, the method includes optimizing the rules (e.g., consolidating and pruning the rules) to mitigate redundancy and improve efficiency.

According to certain non-limiting examples, the number of rules/policies can continually increase over time, with some rules being duplicative. Further, rules might be segmented or combined to be performed more efficiently. For example, several rules related to /32 address might be consolidated to a single rule on a /24 address, reducing the number of computations by applying the logic of a single rule rather than multiple rules. Additionally or alternatively, different data flows related to a /24 address might be routed along separate paths, and a single rule related to the /24 address can be separated into multiple rules related to /32 addresses and applied on the separate paths.

According to some examples, in step 108, the method includes processing data flows through nodes of the network and monitoring the data flows to generate network data thereof.

For example, a network can have at least four different locations at which to place security operations: (i) top-of-rack (ToR) switches that can include data processing units (DPUs), (ii) servers in a lower part of the rack; (iii) smart network interface cards (SmartNICs), which include DPUs, and (iv) a firewall appliance, which can include DPUs. Further, the policies can be enforced by extended Berkley packet filters (eBPFs), which can be associated with a kernel space in a CPU (e.g., in a server) or with a kernel space in a DPU, for example. Thus, the firewall policy can be in enforced inside the IP tables that are inside the operating system (OS) of the server, in the SmartNIC, in the firewall appliance, in the ToR swtich, or in one of the DPUs, for example. If the firewall policy has already been enforced at the IP tables of the OS, then enforcement of the firewall policy at the ToR switch would be redundant, then efficiency can be improved by eliminating the redundant enforcement of the firewall policy.

According to certain non-limiting examples, this optimization of the security operations can be performed using a a binary model that compares the 5-tuple rules to determine which 5-tuples are matched at different points along the data path (e.g., using static analysis or dynamic analysis data).

According to certain non-limiting examples, this optimization of the security operations can be performed placing rule enforcement in an optimal position to minimize an objective function that accounts for changes in the amount of computational resources used to apply the security policies resulting from how the security policies are segmented and where the security policies are placed within the network.

For example, rules that result in dropping many data packets can be applied first to reduce the number of data packets that make it to subsequent rules thereby decreasing the number of computations because fewer data packets results in fewer computations.

Further, a subset of rules may be applicable to a subset of the data flows (e.g., a particular data flow for /32 destination address) by routing the subset of the data flows along a given path, the subset of rules that are applicable to that subset of the data flows can be enforced along the given path, rather than on all the paths, thereby improving efficiency.

According to some examples, in step 106, the method includes determining placements for respective rules among the nodes and network devices of the network, the placements being based, at least in part, on a topology, ecosystem, and/or architecture of the network.

According to some examples, in step 110, the method includes analyzing the network data using a machine learning (ML) model to adapt the rule set and/or the placements of the respective rules.

According to certain non-limiting examples, the ML model can be an unsupervised learning model. For example, the ML model can be clustering algorithms such as a K-means model or a density-based spatial clustering of applications with noise (DBSCAN) model that is used to group similar data packets together. For example, the ML model can be used to distinguish anomalous or suspicious data packets from "normal traffic," which are those data packets that are allowed, based on the normal traffic forming larger, denser clusters, whereas the anomalous or suspicious traffic will form smaller, sparser clusters or not belong to any cluster. Additionally or alternatively, the clusters can be labeled manually as corresponding to normal traffic or suspicious traffic.

According to certain non-limiting examples, the ML model can be a generative artificial intelligence (AI) model, such as latent variable model (LVM) or generative adversarial network (GAN). These models, trained on unlabeled network traffic data, learn the underlying distribution of 'normal' traffic.

For example, a LVM mode, such as a variational auto-encoder (VAE), can encode the input data into a lower-dimensional latent space and decode it back to the original space as output data. For an LVM model that is trained on normal traffic, little information is lost in the encoding and decoding steps such that the output data closely approximates the input data. The closeness of this approximation can be represented by applying a distance measure (e.g., a Euclidean distance, a Hamming distance, a Minkowski distance, a Jaccard distance, a Sorensen-Dice distance, etc.). However, anomalies (e.g., suspicious traffic) can be indicated by high reconstruction errors due to deviation from the learned normal distribution. Thus, a threshold for the distance measure between the input data and the output data can be used to signal suspicious traffic.

Additionally or alternatively, a GAN model can be used to detect suspicious traffic. The GAN model can include a generator network, producing data to mimic normal traffic, and a discriminator network, discerning between real and generated traffic. Once trained, anomalies can be detected when the discriminator categorizes a piece of traffic data as 'fake'. Both methods learn from the data's inherent structure, highlighting anomalies as deviations from the learned norm.

According to certain non-limiting examples, the ML model can be a transform model that predicts whether input traffic is suspicious. For example, the transform model can output a score representing the likelihood that the input packet is suspicious.

According to certain non-limiting examples, the machine-learning model is an unsupervised learning model that groups data packets of the data flows into clusters and identifies data packets outside the clusters as suspicious.

According to certain non-limiting examples, the machine-learning model is a generative adversarial network model that includes a generator model and a discriminator model, the generator model is trained to generate data packets that are consistent with allowed packets, the discriminator model is trained to discriminate the allowed packets from not allowed packets, and ingress packets that are detected by the discriminator model as the not allowed packets are flagged as suspicious packets.

According to certain non-limiting examples, the machine-learning model is a latent variable model that determines the suspicious packets based on a distance measure between an input packet and output packet, wherein the output packet is generated by applying the input packet to the latent variable model.

According to certain non-limiting examples, the machine-learning model is a transformer model that determines the suspicious packets by predicting, based on the network data, whether a data packet is suspicious.

According to certain non-limiting examples, a new rule can be developed to deny the suspicious data packets. Common features of the suspicious data packets can be identified. For example, whether the suspicious data packets have a common source address, a common destination address, a common protocol, etc., and then defining a rule that denies packets having this common feature without denying normal traffic.

According to certain non-limiting examples, a change in the placement of the security operations can be triggered when a virtual machine on one workload is moved from a first workload to a second workload, causing a change in the network flow patterns. The change in the network flow patterns can be detected, and one or more of the security operations that were in front of the first workload can be moved to now be in front of the second workload, especially those security operations that are particular to the virtual machine.

According to some examples, in step 112, the method includes training the ML model using a training data set generated based on historical data and/or reinforcement learning from ongoing network operations.

According to certain non-limiting examples, a controller can identify a new rule that has the effect of denying suspicious data packets. As discussed above, the new rule can be based on denying suspicious data packets having common 5-tuple features, such as a common source address, a common destination address, a common protocol, etc., and then defining a rule that denies packets having this common feature without denying normal traffic. The new rule can be a recommended change to the existing security operations. For example, the recommended change can be signaled to an authorized user (e.g., a security operations center (SOC)) who can manually implement the medium-confidence recommended changes at their discretion.

Additionally or alternatively, the ML model can output recommended changes based on input traffic (e.g., network data), and the recommended changes can be accompanied by a score (e.g., representing the confidence that the recommended change should be implemented). The recommended changes are implemented automatically when the scores fall in a first range (e.g., a high confidence range). For recommended changes having scores that fall in a medium confidence range, the recommended change can be signaled to an authorized user (e.g., a security operations center (SOC)) that can manually implement the medium-confidence recommended changes at their discretion.

The recommended changes can be labeled (e.g., as a true positive, a false positive, or by the actual rule changes implemented by the authorized user) based on the action taken by the authorized user with respect to the recommended changes. The resultant labeled data can be added to labeled training data that is part of a training data set, and the ML model can be trained, via reinforcement learning, using the training data set.

FIG. 2 shows an example of security policies defined using 5-tuples. A 5-tuple refers to a set of five different values that comprise a Transmission Control Protocol/Internet Protocol (TCP/IP) connection. It includes a source IP address/port number, destination IP address/port number, and the protocol in use. System and network administrators can use 5-tuples to identify key requirements for creating a secure, operational, and bidirectional network connection between two or more remote and local machines. The source address is the IP address of the network that creates and sends a data packet, and the destination address is the recipient.

For example, packets matching the 5-tuple in the first rule (i.e., a source address of "0.2.1.0/24", a destination address of "8.8.8.88/24", and a destination port of "53") are allowed. Further, packets matching the 5-tuple in the second rule (i.e., a destination port of "53") are denied. The rules can be applied in the order, such that when the criteria for an earlier rule are satisfied, subsequent rules are not invoked.

Figure 3:
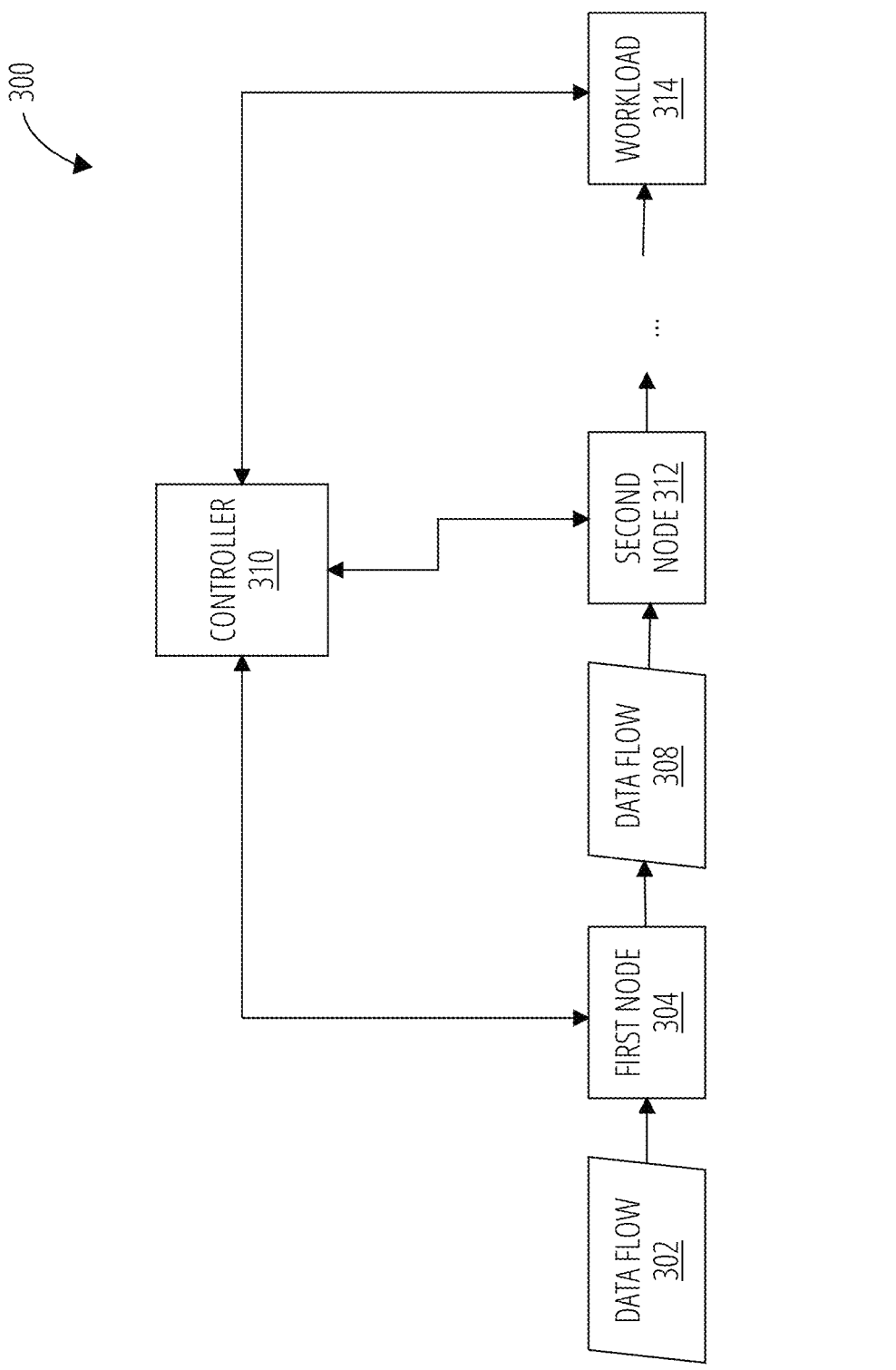
FIG. 3 illustrates a block diagram of an example of a subsystem of a network that includes data processing units (DPUs) and extended Berkley packet filters (eBPFs) that perform various security operation, in accordance with some embodiments.

FIG. 3 illustrates an example distributed security fabric 300 for the systems and methods disclosed herein in which security operations are placed at various locations (e.g., nodes) within a network.

FIG. 3 illustrates processing data flows through respective nodes of a computer network. Distributed security fabric 300 is illustrated using the non-limiting example in which controller 310 receives information from the nodes and determines where respective security operations are placed within the network ecosystem. For example, load balancing among the nodes can be realized by the nodes communicating to the controller 310 the amount of available computational resources and the type of computational resources (e.g., whether the resources are in a CPU, a DPU, an accelerator in the DPU, etc.). Further, the nodes can communicate to the controller 310 various types of telemetry data and observability data, such as network flow patterns of the data flows. Controller 310 can be a central controller that evaluates the received information from the nodes and determines the optimal locations for the security operations.

According to certain non-limiting examples, the nodes can add both in-band and out-of-band metadata that provides context regarding the data flows and the nodes. For example, the in-band metadata can be added to headers of packets in the data flows (e.g., by adding the metadata in optional IPv6 extension headers). Further, the out-of-band metadata can be added to a ledger that can be accessed and written to by each of the nodes.

According to certain non-limiting examples, the in-band metadata can include attestations added to the optional extension headers (e.g., IPv6, TLS, or encapsulation header) of the data packets. These attestations can provide a secure mechanism for communicating what security operations have been applied to the data flow. Space limitations can prevent the packet headers from including a complete and fulsome description of all the security operations. Accordingly, the attestations and information in the header can be used as an index to the ledger, which then provides the details regarding the security operations and/or policies that have been applied to the data flow.

Additionally or alternatively, in band and out-of-band metadata can record information regarding the availability of computation resources at the respective nodes.

As illustrated in FIG. 3, distributed security fabric 300 can include a first node 304 that processes data flow 302 to generate data flow 308, which can include in-band metadata generated at the first node 304. The first node 304 can also send out-of-band metadata to controller 310. The in-band metadata and/or out-of-band metadata can include performance information, data flow information, and/or network function information, as discussed above. For example, data flow 308 can include processed data packets from data flow 302 that are being forwarded from the first node 304 to the second node 312, and these processed data packets can be modified to include various information regarding the computational capacity and the types processing performed at the first node 304.

The data flow 308 can then be processed by a second node 312, which generates a next data flow that includes additional in-band metadata generated at the second node 312 (e.g., attestations regarding which security processes and policies are performed by the second node 312). Further, the second node 312 can generate and send to the controller 310 out-of-band metadata, which can include performance information, data flow information, and/or network function information.

Figure 4:
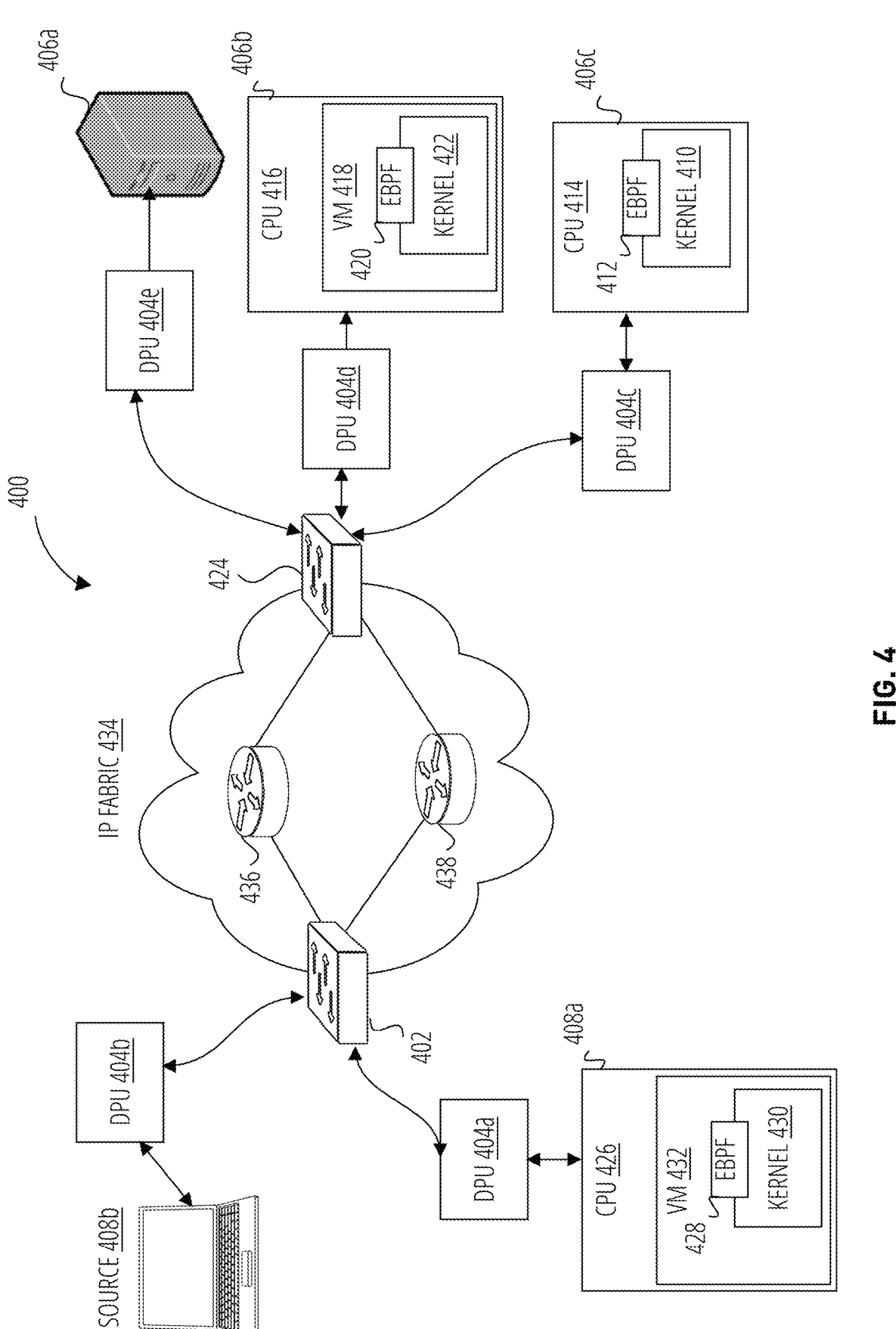
FIG. 4 illustrates a block diagram of an example of a subsystem of a network that includes data processing units (DPUs) and extended Berkley packet filters (eBPFs) that perform various security operation, in accordance with some embodiments.

This process can repeat for each of the nodes along a path through the network including the workload 314, which also can have computational capacity to perform the security operations on the data flows. Further, workload 314 can generate out-of-band information, such as telemetry data, observability data, and audit data that can be useful for informing decisions by controller 310. For example, the Linux security module (LSM) can be used to implement security operations using LSM hooks, as discussed below with reference to FIG. 7C. For example, the workload 314 can be a server (e.g., destination 406a, CPU 414, or CPU 416 illustrated in FIG. 4), and the LSM hook can be used to trigger an action the is defined in an eBPF (e.g. eBPF 412 or eBPF 420). As illustrated in FIG. 4, the eBPF can be at different levels within the CPU. For example, in CPU 416, eBPF 420 is executed in kernel 422, which is a kernel in a virtual machine (i.e., VM 418), rather than a kernel of the CPU itself. In contrast, in CPU 414, eBPF 412 is executed in kernel 410, which is a kernel on the CPU itself.

Workload 314 is one endpoint of a network fabric, and the source is another endpoint. FIG. 4 also illustrates that the source (e.g., 408a) can also include an eBPF (e.g., 428). Further, the LSM hooks in the source node can also be used to execute security operations, similar to how they are performed in the destination. Thus distributed security fabric 300 can be used to place security operations at various enforcement points throughout the fabric to optimize performance.

According to certain non-limiting examples, the security operations can be placed in a DPU or CPU, and this placement can be realized in different ways. For example, the function can be written in a way that it can be compiled into eBPF to run in kernel space (e.g., a packet is written out to the network). The system can generate a sideband channel with additional metadata that indicates information such as a new data flow has started from a given user. To execute the function in eBPF, the function is compiled into instructions that run in eBPF. Additionally or alternatively, the security operations can be placed in the CPU, instead of doing in the eBPF. Additionally or alternatively, the security operations can be placed in a smart network interface card (SmartNIC). The security operations can be translated into a configuration in accelerators or specialized hardware in the DPU or the security operations can be programmed to run in one of the cores that runs on the DPU (e.g., the core can be an advanced RISC (reduced instruction set computer) machines (ARM) core). The security operations can be configured to run on different platforms, e.g., using multi-version coding, and then deciding which of the versions of code to deploy based on which location/device in the network is selected for deployment of the security operation.

According to certain non-limiting examples, network flow patterns can be used to make decisions about which security operations to implement in the network, where to implement them, which network components/devices to implement them in, and how to implement/provision them (e.g., in a container or VM on a CPU, in an eBPF on an ARM core of an DPU, as a serverless network function directly in-line on an accelerator in a DPU). Thus, the security operations can be dynamically created based on network access patterns. Rather than preconfiguring security operations to provide these functions, the system observes network access patterns and/or characteristics of the data flows ((e.g., a central controller receives telemetry and other network data, as illustrated in FIG. 3), and then the system instantiates/provisions these functions dynamically based on what the system has observed. For example, the system/network can be agile in determining what security operations are needed and where they can be optimally placed.

For example, the system might observe a sequence of suspicious packets, and, based on these observations, the system can dynamically adapt by setting up a 5-tuple rule to drop the suspicious packets. Additionally or alternatively, based on these observations, the system can dynamically adapt by setting up an intrusion prevention system (IPS) in the workflow.

FIG. 4 illustrates a system 400, which is an example of a portion of a network. System 400 provides an example of how security operations can be placed at different locations/nodes within the network and within different network devices/components to enable flexibility and agility to adapt to evolving network access patterns and cyber threats. System 400 can include various sources of data (e.g., source 408a and source 408b) which transmit the data via the IP fabric 434 to one or more destinations (e.g., destination 406a, destination 406b, and destination 406c).

Source 408a can include a CPU 426 on which a virtual machine (i.e. VM 432) is running, and VM 432 can include a kernel 430 that is accessed via eBPF 4286

Destination 406b can include a CPU 416 on which a virtual machine (i.e. VM 418) is running, and VM 418 can include a kernel 422 that is accessed via eBPF 420. destination 406c can include a CPU 414 that has a kernel 410 and an eBPF 412. Any of the DPUs, switches, routers, and hosts on DPUs (which can include ePBFs) can operate network nodes.

According to certain non-limiting examples, the data can be generated by an application running on VM 432, which is on the CPU 426 of source 408a. An eBPF 428 on the VM 432 observes the operations of the application, including, e.g., system calls and other interactions with the kernel 430. Generally, the eBPF 428 can provide observability information at the application layer of the open systems interconnection (OSI) hierarchy. The application can be part of a cloud-based application that includes software installed on a user device (e.g., source 408a) and includes software installed on a server (e.g., destination 406b). User interactions at the source endpoint generate data that is then sent to the destination endpoint where additional actions are taken on the data.

For example, the application can be a JAVA application running in VM 432, and the application is performing some business which logic in the application reaches out to a database to use some information that is read from the database to perform the business logic. The eBPF program (e.g., eBPF 428) can monitor the execution of the application, noting observations/information such as the user ID, the application ID, and that the application retrieved information from a given database (other examples of the noted observations/information are provided below). The application generates a data flow that includes the noted observations as metadata (e.g., included in-band in IP packet headers). Along the path (e.g., at the nodes along the path or at the destination) the data flow ends up going through a firewall (or some sort of other filtering technology). the firewall can then look at the metadata of the data flow, and based on the noted observations in the metadata, the firewall can apply selected security processes and/or policies, pass the data flow through the firewall, or drop the data flow, for example. Further, a controller can receive network data (e.g., telemetry data, program traces, etc.) from the nodes in the network and select which security operations to provision within the data path and where the selected security operations are to be placed along the data path. For example, the controller can determine that the security operations performed along the data path from VM 432 to VM 418 include performing a web application firewall (WAF) function, an L3 firewall function, and an L7 firewall function. Further, the controller can determine to provision the WAF function in switch 424 for the first set of data flows and a DPU offload to DPU 404d to perform the WAF function for a second set of data flows (e.g., all data flows except the first set of data flows). Further, the controller to determine that the L3 firewall function are placed in DPU 404d and the L7 firewall function are placed in eBPF 420.

The eBPF program (e.g., eBPF 428) can monitor the execution of the application, noting information such as: (i) the device (e.g., the endpoint, irrespective of its location); (ii) the user (e.g., the one logged into the endpoint); (iii) the application (e.g., what generates the traffic); (iv) the location (e.g., the network location the traffic was generated on); and/or (v) the destination (e.g., the fully qualified domain name (FQDN) to which this traffic was intended). This information for the data flows can be reported to the controller and be used in determining which security operations to place along the data path. This information can be conveyed as metadata that is either in band (e.g., travels with the data flow, such as in packet headers) or out of band (e.g., in an overlay network). For example, an application that generates the data flow can run on one of the sources (e.g., source 408a or source 408b). Metadata can be generated and added to the data flow by the eBPF 428 on the VM 432, which is executed by the CPU 426 of the source 408a. Additionally or alternatively, an eBPF program can operate on the CPU 426. The data flow can go from the source through the IP fabric 434, which can include switch 402, switch 424, router 436, and router 438. As discussed above, the DPUS (e.g., DPU 404a, DPU 404b, DPU 404c, DPU 404d, and DPU 404c) switches (e.g., switch 402 and switch 424) and routers (e.g., router 436 and router 438 in IP fabric 434) along the data path can perform various security operations. These DPUs can also add additional metadata to the packets (e.g., the encapsulated packets sent via a virtual network) based on observations made at the DPUs.

Metadata that is added to the optional headers or optional fields of the data flows at the source can be read from the data flows at subsequent nodes, which can use that data to determine what security operations (e.g., security operation) have already been applied to the data flow, and based on this information a local controller at that node can determine next actions taken on the received data flows (e.g., which security operations should be applied at the current node). For example, for destination 406a, the DPU 404c can read the additional metadata applied by a DPU at the source (e.g., DPU 404a), and the additional metadata can inform a determination of processing steps at DPU 404c, or the additional metadata can be passed along to the destination 406a to inform processing that occurs there.

Similarly, for destination 406b, the DPU 404d can read the additional metadata applied by a DPU at the source (e.g., DPU 404a), and the additional metadata can inform a determination of processing steps at DPU 404d, or the additional metadata can be passed along to the destination 406a to inform processing that occurs there. Additionally, the eBPF 420 can read metadata generated by eBPF 428, which is encoded, e.g., on a header of the IP packets. The additional metadata from DPU 404a and the metadata from eBPF 428 can be used together (e.g., correlated) to inform processing steps performed at VM 418 and/or in kernel 422.

For destination 406c, the application can run directly on the CPU (i.e., CPU 414) rather than on a VM that is running on the CPU. For destination 406c, the DPU 404c can read the additional metadata applied by a DPU at the source (e.g., DPU 404a), and the additional metadata can inform a determination of processing steps at DPU 404c, or the additional metadata can be passed along to the destination 406c to inform processing that occurs there. Additionally, the eBPF 420 can read metadata generated by eBPF 428, which is encoded, e.g., on a header of the IP packets. The additional metadata from DPU 404a and the metadata from eBPF 428 can be used together (e.g., correlated) to inform processing steps performed in the CPU 414 and/or in kernel 410.

A central controller can be used to determine which security operations are placed and where they are placed, the metadata generated at each of the nodes can be conveyed to the central controller, and this metadata can be used to inform the decisions of the central controller.

Figure 5:
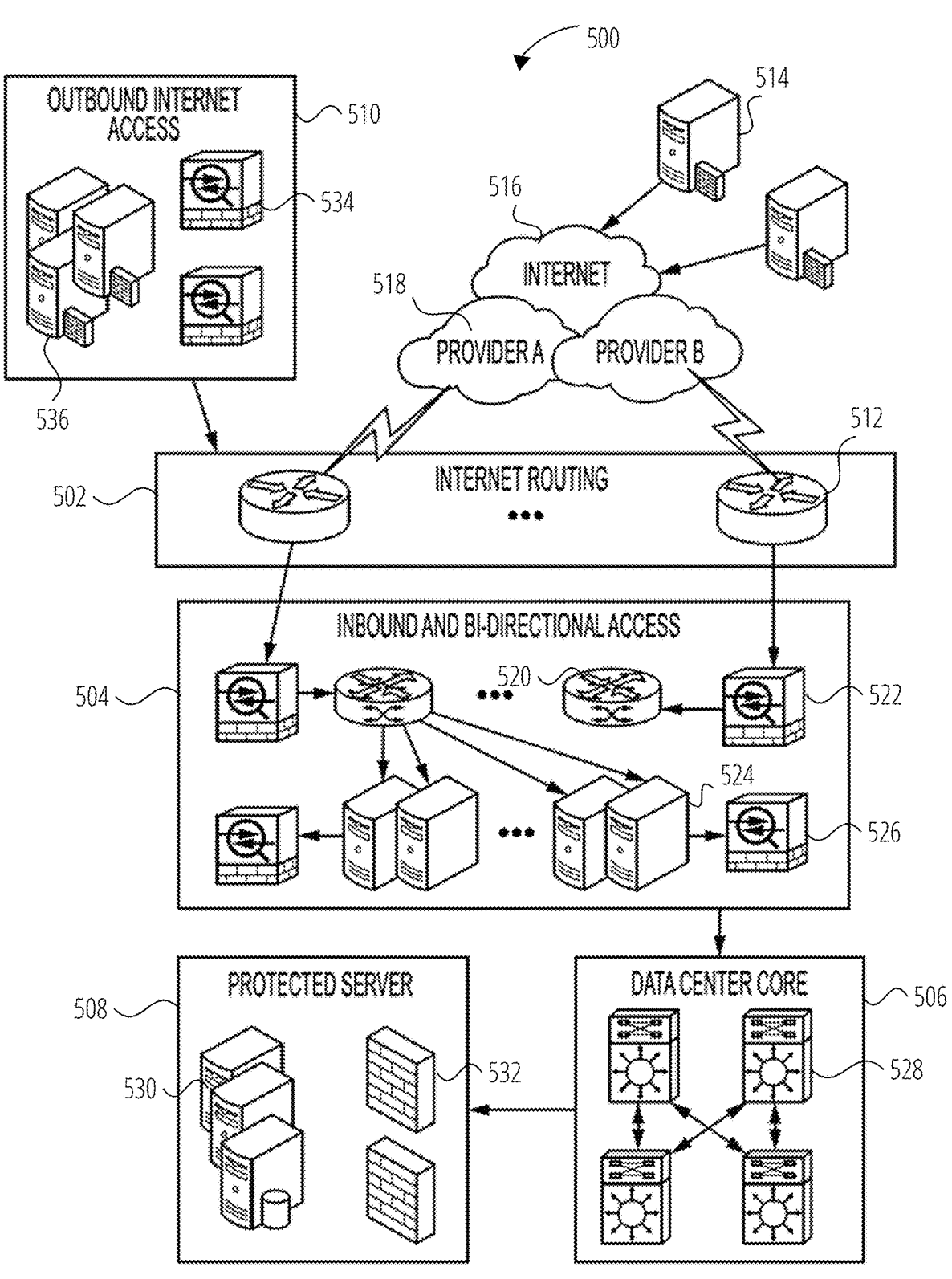
FIG. 5 illustrates a block diagram of an example of a network that implements the dynamically programmed security operations in network components that are placed in front of respective workloads, in accordance with some embodiments.

FIG. 5 illustrates a block diagram of one non-limiting example of an internet edge security framework 500 the includes internet routing 502, inbound and bi-directional access 504, a data center core 506, a back-end protected server 508, and outbound internet access 510. The internet edge security framework 500 can exemplify several aspects of security principles that are applicable for cloud computing, such as in secure web and/or e-commerce design. The various load balancers, servers, routers, firewalls, and switches illustrated in the internet edge security framework 500 can function as nodes in the network that apply security operations to the data flow and generate the in-band and out-of-band metadata that is used to determine where to place the security operations in accordance with the systems and methods disclosed herein.

According to certain non-limiting examples, the proxy server 514 can be a global web cache proxy server that provides enhanced website response to clients within the world wide web (WWW) and provides additional denial of service (DOS) protection and flooding protection. Traffic from the proxy server 514 is conducted through the internet 516 via one or more providers 518. The internet routing can be provided by one or more routers 512, which can be multi-homed border gateway protocol (BGP) internet routers. Further, internet routing 502 can provide border gateway protocol (BGP) transit autonomous system AS prevention mechanisms such as filtering, no-export community value.

According to certain non-limiting examples, inbound and bi-directional access 504 can be an external demilitarized zone (DMZ) that provides, e.g., external firewalls (e.g., ingress firewall 522) and/or intrusion prevention system (IPS). For example, inbound and bi-directional access 504 can provide protection to public Internet Protocol (IP) addressed dedicated, internally un-routable address spaces for communications to load balancers and server untrusted interfaces. The inbound and bi-directional access 504 can be tuned to provide additional transmission control protocol (TCP) synchronize message (SYN) flooding and other DoS protection. In addition to providing reconnaissance scanning mitigation, the IPS service modules (e.g., provided by the load balancer 520) can protect against man-in-the-middle and injection attacks.

The load balancers 520 can provide enhanced application layer security and resiliency services in terminating HTTPS traffic and communicating with front-end web servers 524 on behalf of external clients. For example, external clients do not initiate a direct TCP session with the front-end web servers 524. According to certain non-limiting examples, only the front-end web servers 524 receive requests on untrusted interfaces, and the front-end web servers 524 only make requests to the back-end servers 530 on trusted interfaces. The data center core 506 can include several route switch processors route switch processor 528.

The protected server 508 is protected by the back-end firewall 532 and IPS to provide granular security access to back-end databases. The protected server 508 protects against unauthorized access and logs blocked attempts for access.

According to certain non-limiting examples, the internet edge security framework 500 provides defense in depth. Further, internet edge security framework 500 can advantageously use a dual-NIC (network interface controller) configured according to a trusted/un-trusted network model as a complement to a layered defense in depth approach.

According to certain non-limiting examples, the internet edge security framework 500 can include a DMZ environment (e.g., inbound and bi-directional access 504), which can be thought of as the un-trusted side of the infrastructure. The front-end web servers 524 can have a network interface controller (NIC), which includes the ingress firewall 522 and through which requests are received from outside of the internet edge security framework 500. Additionally, servers can be configured with a second NIC (e.g., egress firewall 526) and can connect to a trusted network (e.g., protected server 508) that is configured with an internal address. According to certain non-limiting examples, firewall services can be provided for protected server 508, which is an area of higher trust. Front-end web servers 524 can make back-end requests on the egress firewall 526. According to certain non-limiting examples, front-end web servers 524 can limit receiving requests to the un-trusted NIC, and front-end web servers 524 can limit making requests to the trusted NIC.

According to certain non-limiting examples, an additional layer of protection can be added by placing a load balancer (e.g., load balancer 520) in front of the front-end web servers 524. For example, the load balancers 520 can terminate TCP sessions originating from hosts on the internet. Further, the load balancers 520 can act as proxies, and initiate another session to the appropriate virtual IP (VIP) pool members, thereby advantageously providing scalability, efficiency, flexibility, and security.

Further regarding internet routing 502, the edge router 512 can provide IP filtering. For example, firewalls can be integrated with the routers 512. These firewalls can filter out traffic and reduce the footprint of exposure. For example, router 512 can be used to filter addresses. Further, the router 512 and/or ingress firewall 522 can be used to perform ingress filtering to cover multi-homed networks. Additionally or alternatively, the router 512 can provide some basic spoofing protection, e.g., by straight blocking large chunks of IP space that are not used as source addresses on the internet. Depending on its capacity, the router 512 can be used to provide some additional filtering to block, e.g., blacklisted IP blocks. Additionally or alternatively, router 512 can provide protection against BGP attacks.

In addition to using dual NICs, the internet edge security framework 500 further illustrates using two separate environments on two different firewall pairs and/or clusters (e.g., a front-end environment such as the inbound and bi-directional access 504 and a back-end environment such as the protected server 508. According to certain non-limiting examples, the internet edge security framework 500 can use a simplified architecture with a high availability (HA) firewall pair for the front end and a separate HA firewall pair for the back end. The back-end environment can include the databases and any other sensitive file servers.

For example, inbound web requests can have the following structure: End host sources secure SSL session=>(Internet Cloud)=>Edge Routers=>Edge Firewall un-trusted DMZ=>(optional) Load Balancer=>Un-trusted web server NIC=/=Trusted web server NIC initiates a database fetch to the back end server=>Edge firewall trusted DMZ =>Data center network core=>Back-End firewall=>High security database DMZ server.

Regarding outbound internet access 510, the internet edge security framework 500 can use a web proxy solution to provide internet access for internal clients. The outbound internet access 510 can include outbound firewalls 534 and outbound proxy servers 536. The outbound proxy servers 536 can provide web filtering mechanisms, internet access policy enforcement and most provide some flavor of data loss prevention, SSL offloading, activity logging, and audit capabilities, for example. In the reverse fashion from the inbound connectivity module, proxy servers can receive requests on trusted interfaces and can make requests on un-trusted interfaces.

Figure 6:
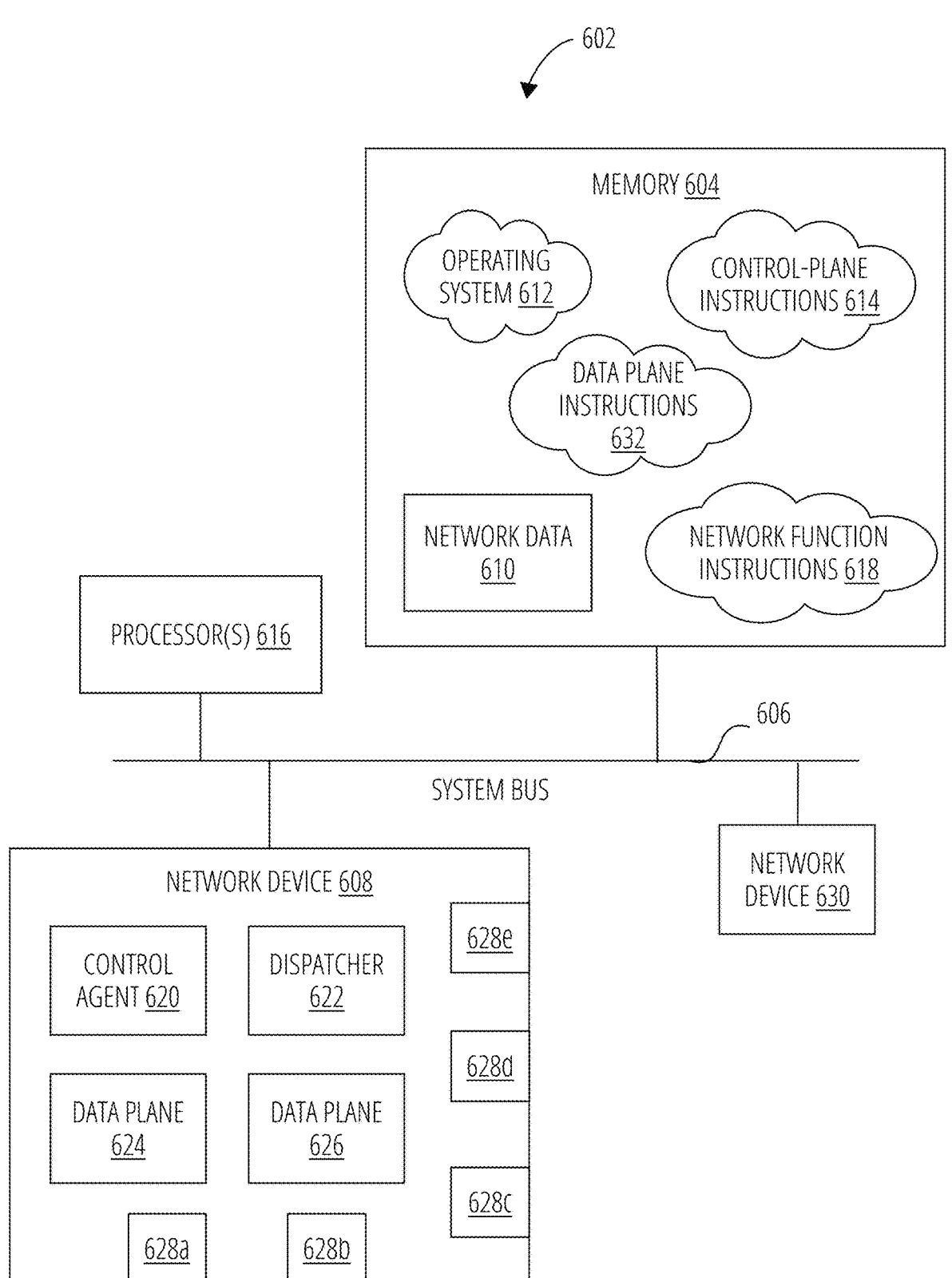
FIG. 6 illustrates a block diagram of an example of a network device, in accordance with certain embodiments.

FIG. 6 is a schematic block diagram of an example device 602 (e.g., a switch, server, CPU, DPU, or combination thereof) that may be used with one or more embodiments described herein. The device 602 may also be any other suitable type of device depending upon the type of network architecture in place. For example, the device 602 can be a network component at a node in a communication network, a node in a data center network, a node in a WiFi network, or an Internet of things (IoT) node. Device 200 can include one or more network devices 608 and 630, one or more processor(s) 616, and a memory 604 interconnected by a system bus 606.

The network device 608 can include the mechanical, electrical, and signaling circuitry for communicating data over physical links coupled to a network. The network device 608 can be configured to transmit and/or receive data using a variety of different communication protocols. the network device 608 can also be used to implement one or more virtual network interfaces, such as for virtual private network (VPN) access, known to those skilled in the art. The network device 608 can be implemented as software instructions executed on a central processing unit (CPU), on a virtual machine (VM), on a Berkley packet filter (BPF) or extended BPF (eBPF) that is configured to implement a network policy or function, for example. Alternatively or additionally, The network device 608 can be implemented as a separate piece of hardware (e.g., a data processing unit (DPU), a graphics processing unit (GPU), a smart network interface card (SmartNIC), a network interface controller, an application-specific integrated circuit (ASIC), field pro-gramable gate array (FPGA), or other device/circuitry con-figured to perform the function of a network component).

The network device 608 can be configured to provide one or more security operation, including, e.g., data-packet fil-tering, load balancing, packet screening, pattern detection for cybersecurity threats, malware detection, firewall pro-tection, data-packet routing, data-packet switching, data-packet forwarding, computing header checksums, or imple-menting network policies. The network device 608 can include (or be part of) a software-defined wide area network (SD-WAN) appliance, a firewall, or a load balancer, for example.

The network device 608 can include a data plane, a control plane, and a management plane, as discussed below. Further, control-plane instructions 614 implementing the control plane and the management plane can be stored and/or in the memory 604 and executed in the processor(s) 616. Additionally or alternatively, the network device 608 can include processors or circuits that implement one or more functions of the control plane and the management plane. The network device 608 can include a series of ports (e.g., port 628a, port 628b, port 628c, port 628d, and port 628c). The network device 608 can also include a control agent 620, a dispatcher 622, a data plane 624, and a data plane 626.

Memory 604 can include a plurality of storage locations that are addressable by the processor(s) 616 and the network device 608 for storing software programs and data structures associated with the embodiments described herein. Memory 604 can include various network data 610 and can include instructions for executing operating system 612, control-plane instructions 614, network function instructions 618, and data plane instructions 632. The processor(s) 616 can include logic adapted to execute the software programs and manipulate the network data 610. An operating system 612 (e.g., the Internetworking Operating System, or IOS®, of Cisco Systems, Inc., another operating system, etc.), por-tions of which can be in memory 604 and executed by the processor(s), functionally organizes the node by, inter alia, invoking network operations in support of software proces-sors and/or services executing on the device.

Network device 608 and network device 630 can be configured to execute security operation, such as serverless network security operations that are in-lined in hardware. The processor(s) 616 can include a controller that deter-mines where to provision the security operation, e.g., at which locations/nodes within the network, in which of the available network devices to provision the security opera-tion, and/or how to provision the security operations (e.g., when the network device/component is a DPU, whether to provision the in-line in an accelerator of the DPU, in an ARM core of the DPU, in an eBPF in the ARM core, a P4 program, etc.) Additionally or alternatively, the controller can be a central controller that is located remotely from device 602.

According to certain non-limiting examples, device 602 can include the following three planes: (i) the dataplane, which processes the transit traffic; (ii) the control plane, which sends and receives control signals to monitor and control the transit traffic; and (iii) the management plane, which interacts with the user or the network management system (NMS).

Consider, For example, the operation of a router as an illustrative network edge device. Interfaces, IP subnets, and routing protocols can be configured through management plane protocols, including, e.g., a command-line interface (CLI), Network Configuration Protocol (NETCONF), and a northbound Representational State Transfer (REST) Application Programming Interface (API). The router runs control plane routing protocols (e.g., Open Shortest Path First (OSPF), Enhanced Interior Gateway Routing Protocol (EI-GRP), Border Gateway Protocol (BGP), etc.) to discover adjacent devices and the overall network topology, or to discover reachability information in case of distance/path vector protocols). The router inserts the results of the control-plane protocols into Routing Information Base (RIB) and Forwarding Information Base (FIB). The data-plane software or ASICs, e.g., then use the FIB structures to forward the transit traffic. The management plane protocols (e.g., Simple Network Management Protocol (SNMP)) can then be used to monitor the device operation, its performance, interface counters, etc.

Continuing with the non-limiting example of device 602 being a router, in addition to controlling the routing protocols, the control plane protocols can also perform numerous other functions including: (i) interface state management (e.g., Point-to-Point Protocol (PPP), Transmission Control Protocol (TCP), and Link Aggregation Control Protocol (LACP)); (ii) connectivity management (e.g., Bidirectional Forwarding Detection (BFD), Connectivity Fault Management (CFM), etc.); (iii) adjacent device discovery (e.g., "hello" mechanisms present in most routing protocols, such as, End System-to-Intermediate System (ES-IS), Address Resolution Protocol (ARP), Internet Protocol version 6 (IPv6_Neighbor Discovery Protocol (NDP), Universal Plug and Play (UPnP) Simple Service Discovery Protocol (SSDP), etc.); (iv) topology or reachability information exchange (IPv6 routing protocols, Intermediate System to Intermediate System (IS-IS) in Transparent Interconnection of Lots of Links (TRILL) and Shortest Path Bridging (SPB), Spanning Tree Protocol (STP), etc.); and (v) service provisioning (e.g., Resource Reservation Protocol (RSVP) for IntServ or Traffic Engineering (TE) based on Multiprotocol Label Switching (MPLS), uPNP SOAP (Simple Object Access Protocol) calls, etc.).

Still continuing with the non-limiting example of device 602 being a router, in addition to forwarding packets, the dataplane can also perform the following functions: (i) network address translation (NAT) session creation and NAT table maintenance; (ii) neighbor address gleaning (e.g., dynamic Media Access Control (MAC) address learning in bridging, IPv6 Source Address Validation Improvement (SAVI), etc.); (iii) NetFlow or sampled flow (sFlow) accounting; (iv) network access control list (ACL) logging; and (v) Error signaling, such as Internet Control Message Protocol (ICMP).

According to certain non-limiting examples, device 602 can configure a data plane to perform various security operations including, but not limited to, applying 5-tuple rules, data-packet filtering, load balancing, security screening, malware detection, firewall protection, data-packet routing, data-packet switching, data-packet forwarding, computing header checksums, or implementing network policies. Security screening can include, but is not limited to, deep packet inspections, analysis of behavioral graphs for detection of cyber attacks and/or malicious software, anomaly detection, cyber-attack signature detection, packet filtering, intrusion prevention systems, extended detection and response, endpoint detection and response, and/or network detection and response functions.

According to certain non-limiting examples, the management and control planes can be implemented in a central processing unit (CPU) or in a data processing unit (DPU). According to certain non-limiting examples, the data plane could be implemented in numerous ways, including, e.g.: (i) as optimized code running on the same CPU as the control plane; (ii) as code running on a dedicated CPU core (e.g., a dedicated CPU for high-speed packet switching, such as a Linux server); (iii) as code running on linecard CPUs (e.g., a CISCO 7200 series router); (iv) as dedicated processors (e.g., network process units (NPUs), data process units (DPUs), smart network interface cards (SmartNICs), etc.); and (v) as switching hardware (application-specific integrated circuits (ASICs), field programable gate arrays (FP-GAs), etc.); and (vi) as switching hardware on numerous linecards.

According to certain non-limiting examples, the dataplane receives and processes the ingress packets. Further, the dataplane can selectively forward packets destined for the router (e.g., Secure Shell (SSH) traffic or routing protocol updates) or packets that need special processing (e.g., IP datagrams with IP options or IP datagrams that have exceeded their TTL) to the control plane.

According to certain non-limiting examples, the management ports on some devices (e.g. data center switches) can be connected directly to a control-plane CPU and thus bypass a switching ASIC.

According to certain non-limiting examples, the control plane can pass outbound packets to the data plane, or use its own forwarding mechanisms to determine the outgoing interface and the next-hop router (e.g., when using the local policy routing).

Figure 7A:
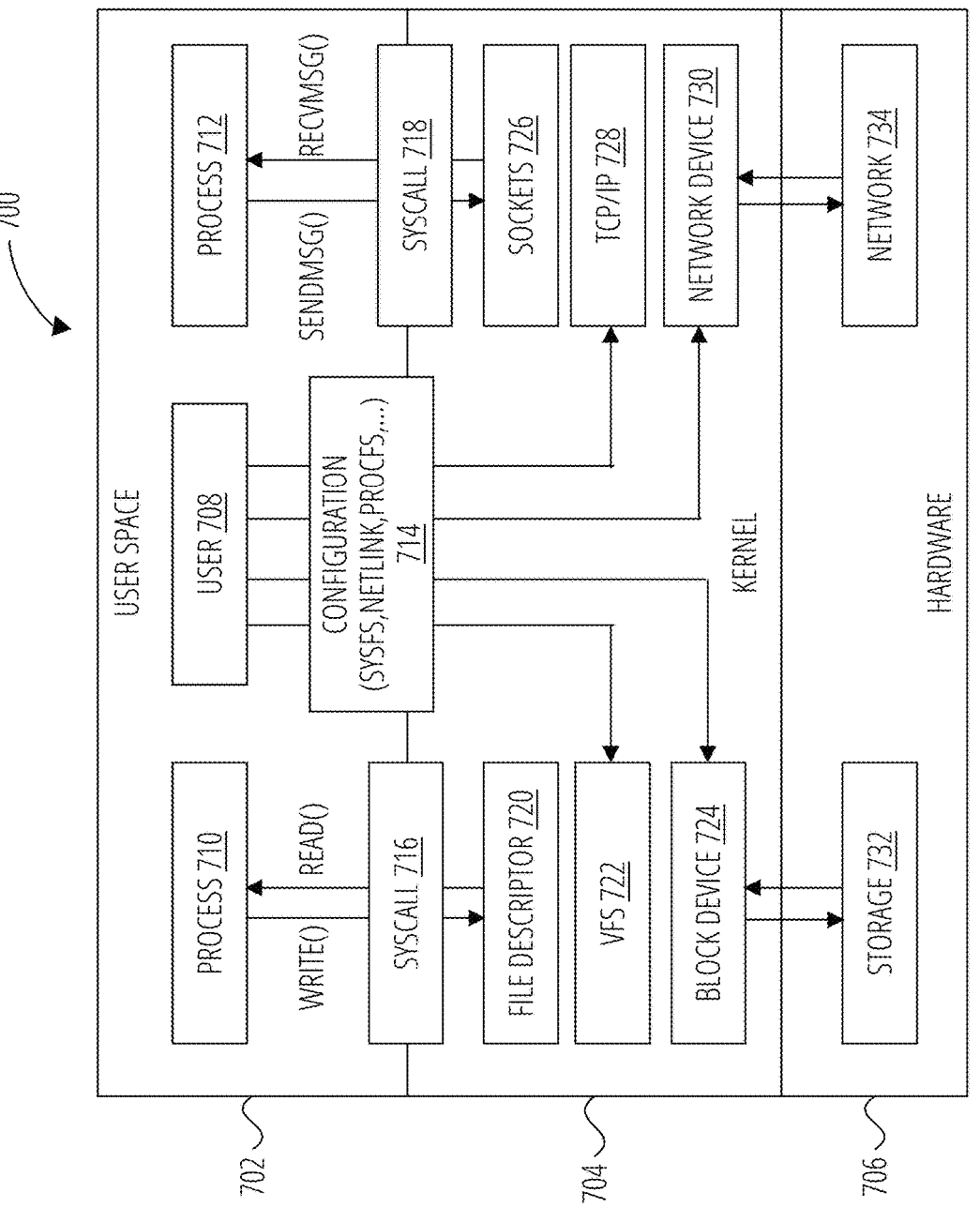
FIG. 7A illustrates a block diagram of an example of an extended Berkley packet filter (eBPF), in accordance with some embodiments.

FIG. 7A illustrates a non-limiting example of implementing extended Berkley pack filters (eBPF). The eBPF architecture 700 can be implemented on a central processing unit (CPU and includes a user space 702, kernel 704, and hardware 706. For example, the user space 702 can be a place where regular applications run, whereas the kernel 704 is where most operating system-related processes run. An eBPF in a processor at a node (e.g., a server or router) of the network can be used to apply security operations and generate network data based on the processing of data flows, including, e.g., program traces and data the types of system calls to kernel 704. This network data can be used to generate in-band information and out-of-band information that provides the security service context for which security operations have been applied to a data flow at the respective nodes within a network.

Kernel 704 can have direct and full access to the hardware 706. When a given application in user space 702 connects to hardware 706, the application can do so via calling APIs in kernel 704. Separating the application and the hardware 706 can provide security benefits. An eBPF can allow user-space applications to package the logic to be executed in kernel 704 without changing the kernel code or reloading.

Since eBPF programs run in the kernel 704, the eBPF programs can have visibility across all processes and applications, and, therefore, they can be used for many things: network performance, security, tracing, and firewalls.

The user space 702 can include a process 710, a user 708, and process 712. Kernel 704 can include a file descriptor 720, a virtual file system (VFS) 722, a block device 724, sockets 726, a TCP/IP 728, and a network device 730. Hardware 706 can include storage 732 and network 734.

eBPF programs are event-driven and are run when the kernel or an application passes a certain hook point. Predefined hooks include system calls, function entry/exit, kernel tracepoints, network events, and several others. If a predefined hook does not exist for a particular need, it is possible to create a kernel probe (kprobe) or user probe (uprobe) to attach eBPF programs almost anywhere in kernel or user applications. When the desired hook has been identified, the eBPF program can be loaded into kernel 704 using the bpf system call (e.g., syscall 716 or syscall 718). This is typically done using one of the available eBPF libraries. The next section provides an introduction into the available development toolchains. Verification of the eBPF program ensures that the eBPF program is safe to run. It validates that the program meets several conditions (e.g., the conditions can be that the process loading the eBPF program holds the required capabilities/privileges; the program does not crash or otherwise harm the system; and the program always runs to completion).

A benefit of kernel 704 is abstracting the hardware (or virtual hardware) and providing a consistent API (system calls) allowing for applications to run and share the resources. To achieve this, a wide set of subsystems and layers are maintained to distribute these responsibilities. Each subsystem can allow for some level of configuration (e.g., configuration 714) to account for different needs of users. Each subsystem can allow for some level of configuration to account for the different needs of users. When a desired behavior cannot be configured, kernel 704 can be modified to perform the desired behavior. This modification can be realized in three different ways: (1) by changing kernel source code, which may take a long time (e.g., several years) before a new kernel version becomes available with the desired functionality; (2) writing a kernel module, which may require regular editing (e.g., every kernel release) and incurs the added risk of corrupting the kernel 704 due to lack of security boundaries; or (3) writing an eBPF program that realizes the desired functionality. Beneficially, eBPF allows for reprogramming the behavior of kernel 704 without requiring changes to kernel source code or loading a kernel module.

Many types of eBPF programs can be used, including socket filters and system call filters, networking, and tracing. Socket filter type eBPF programs can be used for network traffic filtering, and can be used for discarding or trimming of packets based on the return value. XDP type eBPF programs can be used to improve packet processing performance by providing a hook closer to the hardware (at the driver level), e.g., to access a packet before the operative system creates metadata. Tracepoint type eBPF programs can be used instrument kernel code, e.g., by attaching an eBPF program when a "perf" event is opened with command "perf_event_open(2)", then use the command "ioctl(2)" to return a file descriptor that can be used to enable the associated individual event or event group and to attach the eBPF program to the tracepoint event. Helper type eBPF programs can be used to determines which subset of in kernel functions can be called. Helper functions are called from within eBPF programs to interact with the system, to operate on the data passed as context, or to interact with maps.

Figure 7B:
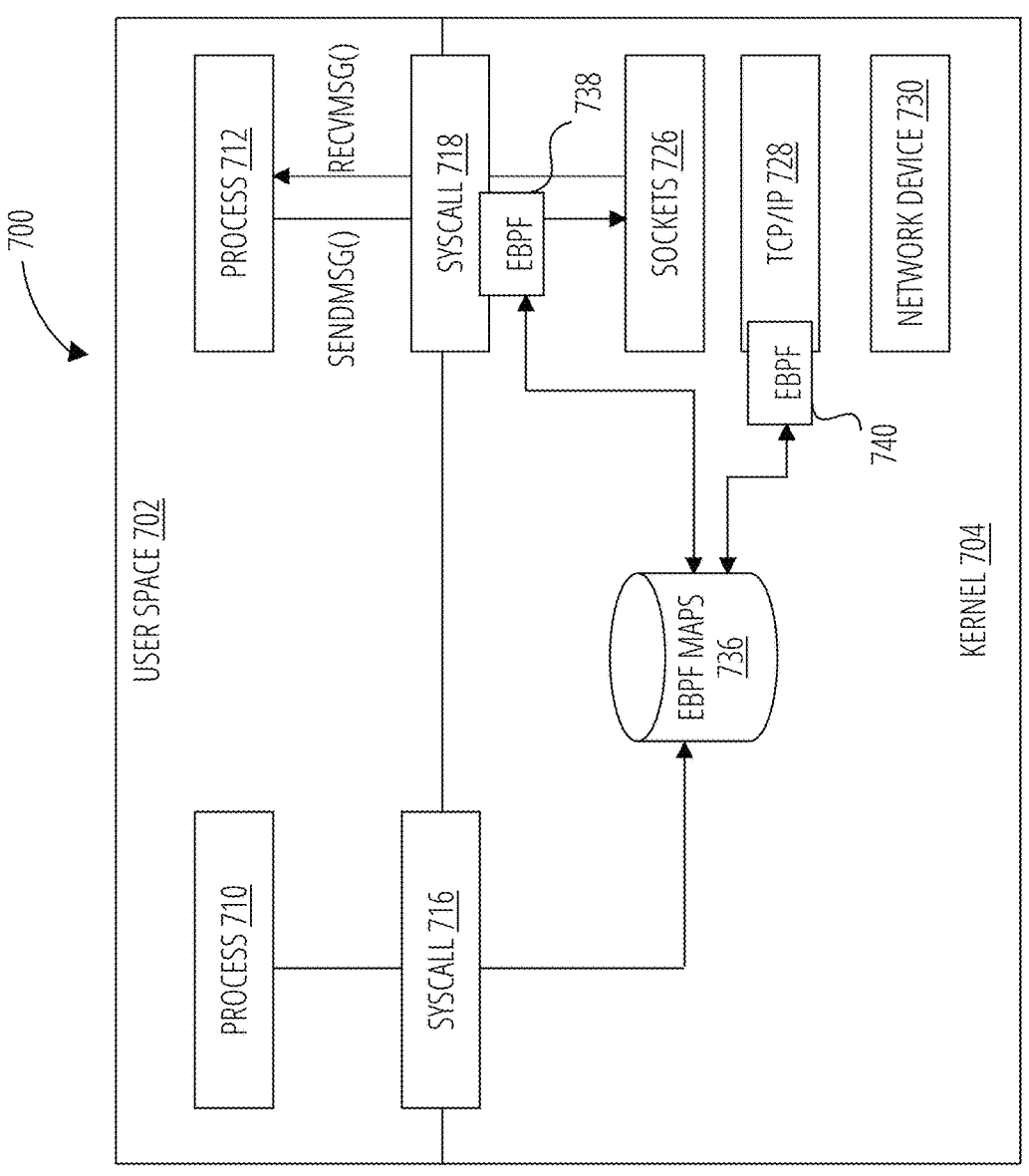
FIG. 7B illustrates a block diagram of an example of an eBPF map in an eBPF, in accordance with some embodiments.
Figure 7C:
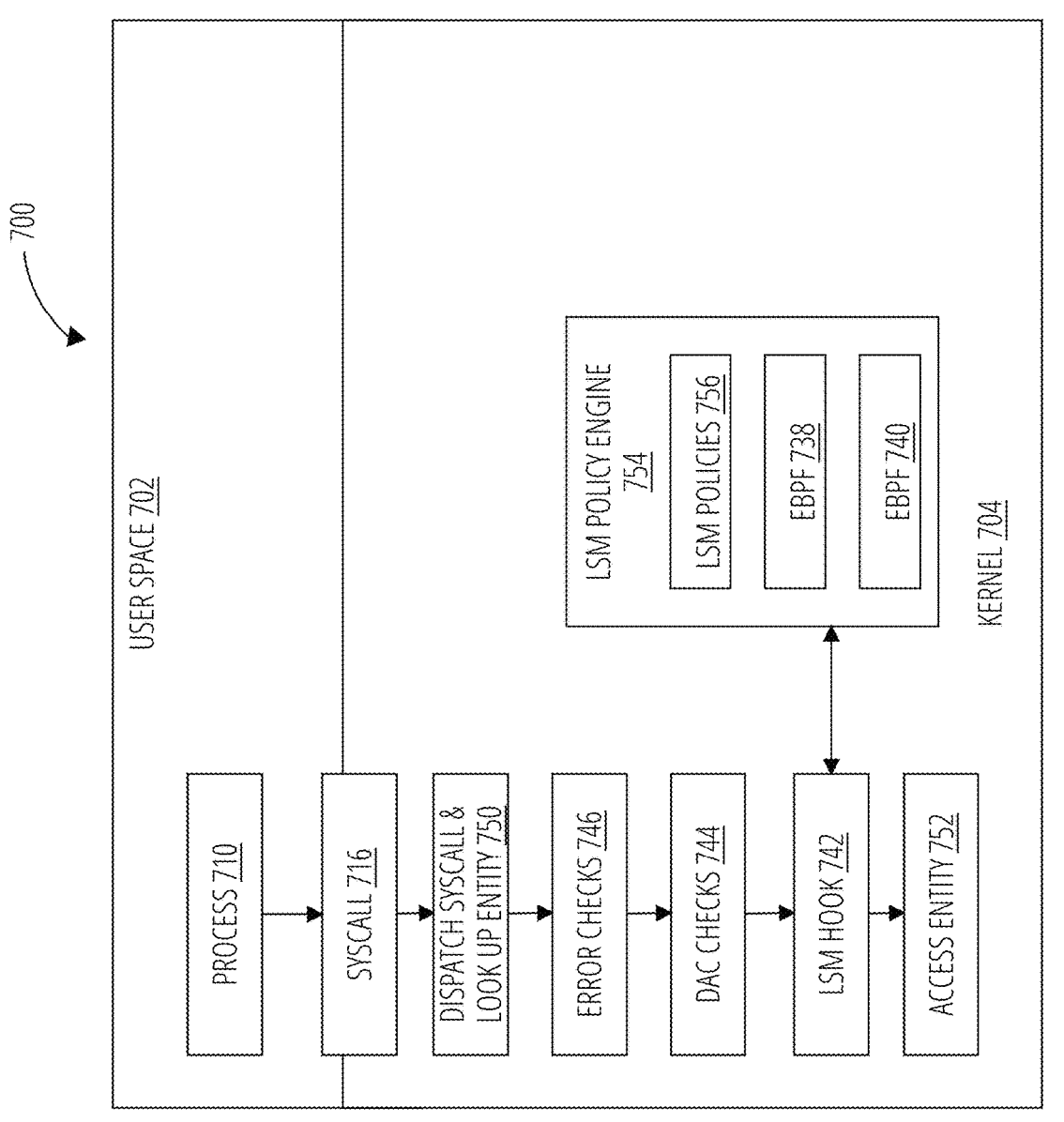
FIG. 7C illustrates a block diagram of an example of implementing Linus security module (LSM) hooks and Linus security module extended Berkley packet filter programs (LSM BPF), in accordance with some embodiments.

FIG. 7B illustrates just-in-time (JIT) compilation of eBPF programs. JIT compilation translates the generic bytecode of the program into the machine specific instruction set to optimize execution speed of the program. This makes eBPF programs run as efficiently as natively compiled kernel code or as code loaded as a kernel module.

An aspect of eBPF programs is the ability to share collected information and to store state information. For example, eBPF programs can leverage eBPF maps 736 to store and retrieve data in a wide set of data structures. The eBPF maps 736 can be accessed from eBPF program 738 and eBPF program 740 as well as from applications (e.g., process 710 and process 712) in user space 702 via a system call (e.g., syscall 716 and syscall 718). Non-limiting examples of supported map types include, e.g., hash tables, arrays, least recently used (LRU), ring buffer, stack trace, and longest prefix match (LPM), which illustrates the diversity of data structures supported by eBPF programs.

The eBPF architecture 700 illustrates the use a Linus security module (LSM) to implement network/security functions at an endpoint in a network fabric (e.g., in the kernel spaces of a server or a client device. As discussed above, a process 710 in user space 702 results in a syscall 716 to kernel 704, and syscall 716 causes a dispatch syscall & look up entity 750, where the entity can be, e.g., a file, socket, or inode. After performing error checking (e.g., error checks 746), kernel 704 consults the discretionary access control (DAC) mechanism (e.g., DAC checks 744), and kernel 704 then calls the hooks (e.g., LSM hook 742), including hooks for the minor modules if any are present, followed by the hooks of the major security module in place at the time. To allow for module stacking, the security modules are separated into major modules and minor modules. There can only be one major security module running in a given system, while minor modules can be stacked to provide different security features. Historically, major modules had access to opaque security blobs provided by the LSM framework while minor modules did not, but this distinction is fading with more recent kernel releases.

LSM policy engine 754 can include eBPF program 738, eBPF program 740, and LSM policies 756. LSM policies 756 can include AppArmor and/or SELinux. When a hook in LSM hook 742 is triggered by syscall 716, LSM policy engine 754 determines one or more actions (e.g., security operation to be applied). Like the 5-tuple rules discussed with reference to FIG. 2 can trigger respective actions (e.g., security operations), the hooks triggered at LSM hook 742 trigger respective actions, which are defined in LSM policy engine 754. These actions are defined in LSM policies 756, eBPF program 738, and/or eBPF program 740. There can be many different types of security hooks that trigger actions, including, e.g., security hooks for file system operations;
    opening, creating, moving, and deleting files;
    mounting and unmounting file systems;
    task/process operations;
    allocating and freeing tasks, changing task user and group identities;
    socket operations;
    creating and binding sockets;
    receiving and sending messages;
    program execution operations;
    mount using fs_context;
    filesystem operations;
    inode operations;
    kernfs node operations;
    file operations;
    task operations;
    Netlink messaging;
    Unix domain networking;
    socket operations;
    SCTP;
    Infiniband;

XFRM operations;

individual messages held in System V IPC message queues;

System V IPC Message Queues;

System V Shared Memory Segments;

System V Semaphores;

Audit;

the general notification queue;

using the eBPF maps and programs functionalities through;

perf events; and io_uring.

According to certain non-limiting examples LSM policy engine 754 can be implemented using Kernel Runtime Security Instrumentation (KRSI), which can also be referred to as BPF-LSM. For example, a BPF-LSM program can be executed in the kernel with parsed information from the manager from the enforcement part. The BPF-LSM program can follow the LSM framework rule: checking the condition and returning the result. 0 means pass (Allow), or error code means not pass (Deny). For example, the BPF-LSM program can perform the steps of: (i) before the BPF-LSM program is attached to a particular LSM hook, the BPF-LSM program imports necessary libraries and creates data structures and events that will be collected from the kernel; (ii) once the BPF-LSM program is attached to the specific LSM hook, the BPF-LSM program performs: (1) filtering, (2) kernel context pre-processing, (3) a condition phase, and (4) a policy action. In the filtering, filters matched containers to control the behaviors. In the kernel context pre-processing: the program receives a kernel context observed only in the kernel. For example, the BPF-LSM program can pre-process the contexts for the corresponding LSM hook due to resource problems. In the condition phase, the BPF-LSM program can parse conditions that are used by a policy. For example, the conditions can decide whether the system call is safe to process. In the policy action, the BPF-LSM program can check security with an action. For example, the policy can give back the results of the LSM function to the program, such that if the action is "Allow", the BPF-LSM program can return a value of "0," otherwise the BPF-LSM program can return a value of "−1." Policies in this system can be stackable to the old policies if the policy affects the same container.

According to certain non-limiting examples, when LSM policy engine 754 determines that accessing the entity (e.g., the entity can be a file, socket, or inode) is allowed, then the entity is accessed (e.g., access entity 752).

As discussed above, the LSM framework provides a modular architecture with built-in hooks in the kernel, allowing the installation of security modules to strengthen access control. The LSM framework can include at least four parts/components. First, the framework can include inserted calls to security hook functions at different key points in the kernel source code. Second, the framework can provide a generic security system call that allows security modules to write new system calls for security-related applications, styled similarly to the original Linux system call socketcall( ), which is a multiplex system call. Third, the framework can implement registration and deregistration functions so that access control policies can be implemented as kernel modules (e.g, implemented through security_add_hooks and security_delete_hooks). Fourth, the framework can transform most of the capabilities logic into an optional security module.

According to certain non-limiting examples, the LSM framework controls operations on kernel objects by providing a series of hooks using the hook injection method. In the example of accessing the file open function process, the access diagram of hook functions can be implemented by: (1) after entering the kernel through a system call, the system performs an error check first; (2) once the error check passes, permission checks are performed (i.e., Discretionary Access Control (DAC) checks); and (3) after passing the permission checks, Mandatory Access Control (MAC) is enforced. For example, the permission checks can be based on user IDs by allowing resource access once the user ID is verified. Further, MAC can provide a type of access control that prohibits subjects from interfering, utilizing security labels, information classification, and sensitivity to control access, determining access based on comparing the subject's level and the sensitivity of the resource.

Figure 8:
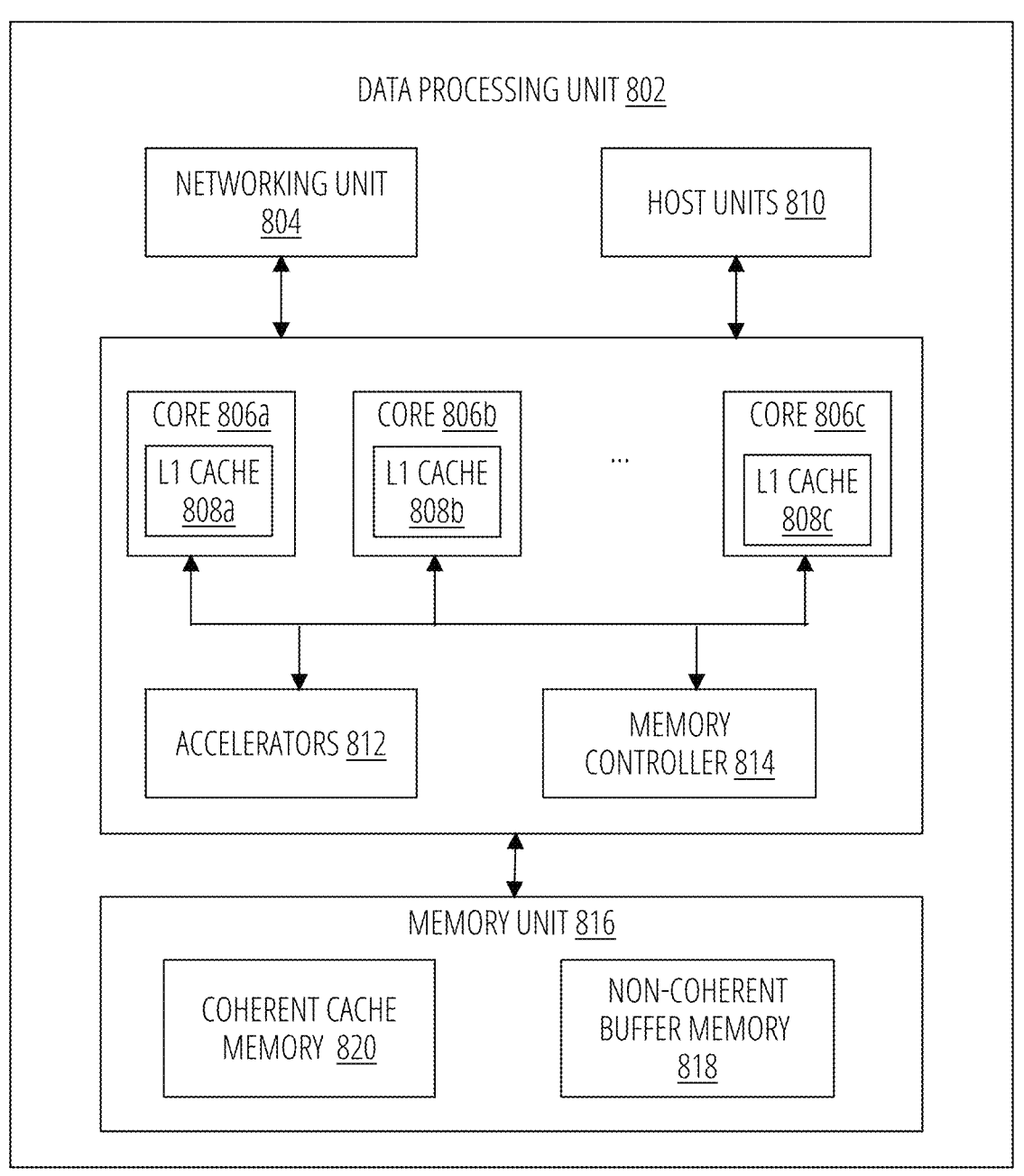
FIG. 8 illustrates a block diagram of an example of a data processing unit (DPU), in accordance with some embodiments.

A non-limiting example of a data processing unit (i.e., DPU 802) is illustrated in FIG. 8. The DPU 802 can include two or more processing cores, for example. DPU 802 can be a hardware chip that is implemented in digital logic circuitry and can be used in any computing or network device. The DPU 802 can be used to perform security operations and to generate in-band metadata and out-of-band metadata at the respective nodes within a network.

DPU 802 can receive and transmit data packets via networking unit 804, which can be configured to function as an ingress port and egress port, enabling communications with one or more network devices, server devices (e.g., servers), random access memory, storage media (e.g., solid state drives (SSDs)), storage devices, or a data center fabric. The ports can include, e.g., a peripheral component interconnect express (PCI-e) port, Ethernet (wired or wireless) port, or other such communication media. Additionally or alternatively, DPU 802 can be implemented as an application-specific integrated circuit (ASIC), can be configurable to operate as a component of a network appliance or can be integrated with another DPUs within a device.

In FIG. 8, e.g., DPU 802 can include programmable processing cores 806a, 806b, . . . , 806c (collectively referred to as "cores 806") and each of the cores 806 can include an L1 cache (e.g., L1 cache 808a, L1 cache 808b, . . . , L1 cache 808c). DPU 802 can include a memory unit 816. Memory unit 816 can include different types of memory or memory devices (e.g., coherent cache memory 820 and non-coherent buffer memory 818). In some examples, the cores 806 can include at least two processing cores. DPU 802 also includes a networking unit 804, one or more host units 810, a memory controller 814, and one or more accelerators 812. Each of the cores 806, networking unit 804, memory controller 814, host units 810, accelerators 812, and memory unit 816 including coherent cache memory 820 and non-coherent buffer memory 818 can be connected to allow communication therebetween.

Cores 806 can comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 806 can be programmed to process one or more events or activities related to a given data packet such as, For example, a networking packet or a storage packet. Each of cores 806 can be programmable using a high-level programming language, e.g., C or C++.

The use of DPUs can be beneficial for network processing of data flows. In some examples, cores 806 can be capable of processing data packets received by networking unit 804 and/or host units 810, in a sequential manner using one or more "work units." In general, work units are sets of data exchanged between cores 806 and networking unit 804 and/or host units 810.

Memory controller 814 can control access to memory unit 816 by cores 806, networking unit 804, and any number of external devices, e.g., network devices, servers, or external storage devices. Memory controller 814 can be configured to perform a number of operations to perform memory management in accordance with the present disclosure. In some examples, memory controller 814 can be capable of mapping a virtual address to a physical address for non-coherent buffer memory 818 by performing a number of operations. In some examples, memory controller 814 can be capable of transferring ownership of a cache segment of the plurality of segments from first core 806a to second core 806b by performing a number of operations.

DPU 802 can act as a combination of a switch/router and a number of network interface cards. For example, networking unit 804 can be configured to receive one or more data packets from and transmit one or more data packets to one or more external devices, e.g., network devices. Networking unit 804 can perform network interface card functionality and packet switching.

Additionally or alternatively, networking unit 804 can be configured to use large forwarding tables and offer programmability. Networking unit 804 can advertise Ethernet ports for connectivity to a network. In this way, DPU 802 supports one or more high-speed network interfaces, e.g., Ethernet ports, without the need for a separate network interface card (NIC). Each of host units 810 can support one or more host interfaces, e.g., PCI-e ports, for connectivity to an application processor (e.g., an x86 processor of a server device or a local CPU or GPU of the device hosting DPU 802) or a storage device (e.g., a solid state drive (SSD)). DPU 802 can also include one or more high bandwidth interfaces for connectivity to off-chip external memory (not illustrated in FIG. 8). Each of accelerators 812 can be configured to perform acceleration for various data-processing functions, such as look-ups, matrix multiplication, cryptography, compression, or regular expressions. For example, accelerators 812 can comprise hardware implementations of look-up engines, matrix multipliers, cryptographic engines, compression engines, or regular expression interpreters.

DPU 802 can improve efficiency over x86 processors for targeted use cases, such as storage and networking input/output, security and network function virtualization (NFV), accelerated protocols, and as a software platform for certain applications (e.g., storage, security, and data ingestion). DPU 802 can provide storage aggregation (e.g., providing direct network access to flash memory, such as SSDs) and protocol acceleration. DPU 802 provides a programmable platform for storage virtualization and abstraction. DPU 802 can also perform firewall and address translation processing, stateful deep packet inspection, and cryptography. The accelerated protocols can include TCP, UDP, transport layer security (TLS), Internet protocol security (IPSec) (e.g., accelerates advanced encryption standard (AES) variants, secure hashing algorithm (SHA), and public-key cryptography (PKC)), Remote Direct Memory Access (RDMA), and Internet Small Computer System Interface (ISCSI). DPU 802 can also provide quality of service (QOS) and isolation containers for data, and provide LLVM binaries.

DPU 802 can support software including network protocol offload (e.g., TCP/IP acceleration, RDMA and RPC); initiator and target side storage (e.g., block and file protocols); high-level application APIs (e.g., compute, network and storage APIs); fine-grain load balancing, traffic management, and quality of service (QOS); network virtualization and network function virtualization (NFV); and firewall, security, deep packet inspection (DPI), and encryption (e.g., IPsec, secure sockets layer and transport layer security (SSL/TLS)).

Figure 9:
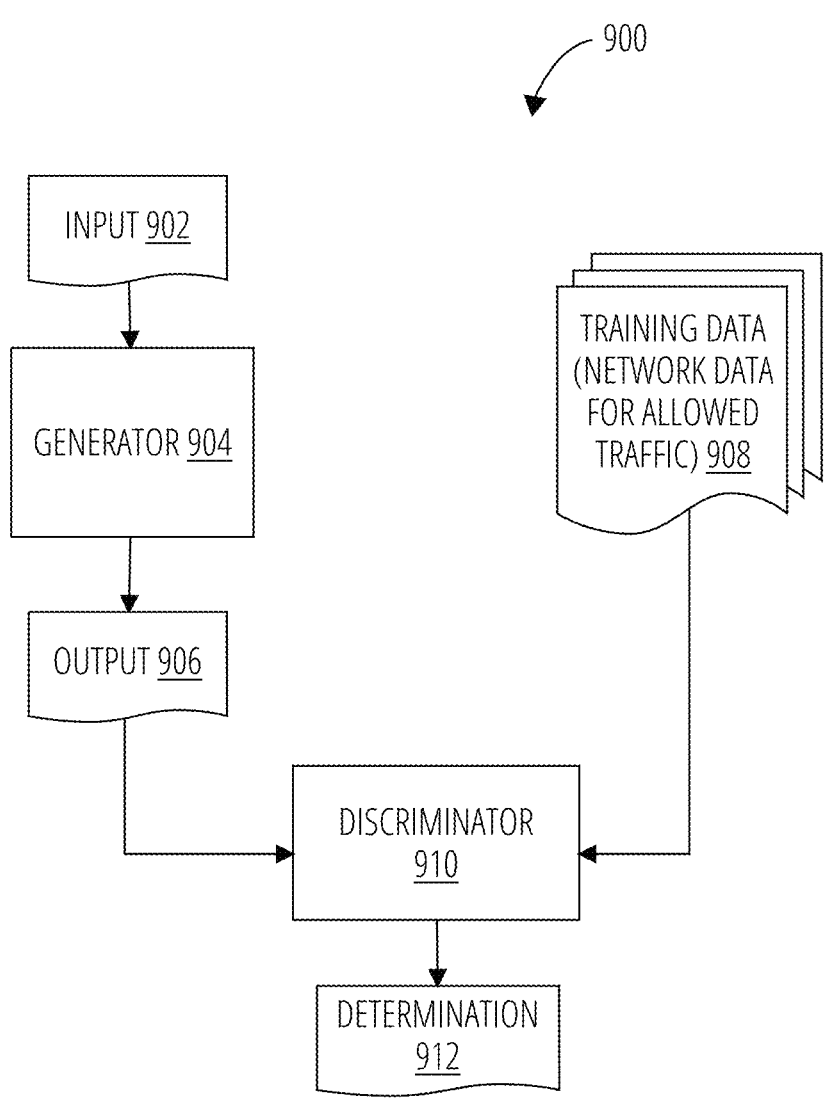
FIG. 9 illustrates an example of a block diagram of training a generative adversarial network (GAN), in accordance with some embodiments.

FIG. 9 illustrates a GAN architecture 900 that can be used for determining suspicious traffic and recommending/new security operations/rules and/or placement of the rules among the nodes of the network, as discussed above with reference to step 110 in FIG. 1. The GAN architecture 900 has two parts: the generator 904 and the discriminator 910. For example, generator 904 can learn to generate network data (e.g., data flows, 5-tuples, data packets, etc.) that represent "normal traffic," i.e., traffic that is allowed through the network. The discriminator 910 learns to distinguish the generated network data of the generator 904 from real network data for allowed traffic. Discriminator 910 receives two sets of network data (i.e., the output 906 from the generator 904 and real network data from the training data 908), and analyzes the two network data to make a determination 912 which is the real network data. The generator 904 fools the discriminator 910 when determination 912 is incorrect regarding which of the network data received by the discriminator 910 was real.

Both the generator and the discriminator can be neural networks with weights between nodes in respective layers, and these weights are optimized by training against the training data 908, e.g., using backpropagation. The instances when the generator 904 successfully fools the discriminator 910 become negative training examples for the discriminator 910, and the weights of the discriminator 910 are updated using backpropagation. Similarly, the instances when the generator 904 is unsuccessfully in fooling the discriminator 910 become negative training examples for the generator 904, and the weights of the generator 904 are updated using backpropagation.

When the GAN architecture 900 is used to train the ML model (i.e., the discriminator 910) a determination of fake for the actual network data received by a controller can indicate that the corresponding data traffic is suspected of being malicious (e.g., suspicious data packets). And one or more 5-tuple rules can be generated to deny the suspicious data packets.

Figure 10A:
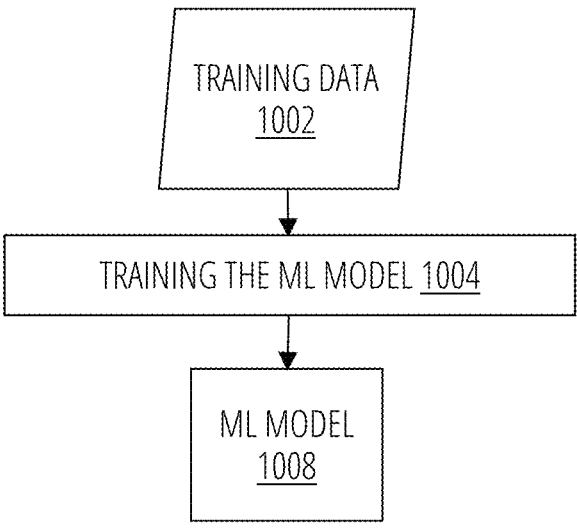
FIG. 10A illustrates a block diagram of an example of training a machine learning (ML) model to determine trust scores, in accordance with some embodiments.

FIG. 10A illustrates an example of training an ML model 1008 that can be used for determining suspicious traffic and recommending/new security operations/rules and/or placement of the rules among the nodes of the network, as discussed above with reference to step 110 in FIG. 1. In step 1004, training data 1002 (e.g., network data, program traces, log files, data flow statistics through the network, packet latencies, rates for dropped packets, etc.) is applied to train the ML model 1008. For example, the ML model 1008 can be an artificial neural network (ANN) that is trained via supervised or unsupervised learning using a backpropagation technique to train the weighting parameters between nodes within respective layers of the ANN.

In supervised learning, the training data 1002 is applied as an input to the ML model 1008, and an error/loss function is generated by comparing the output from the ML model 1008 with the desired output (e.g., labels such as "normal data packets" and "suspicious data packets" can be associated with portions of network data in the training data 1002). The coefficients of the ML model 1008 are iteratively updated to reduce an error/loss function. The value of the error/loss function decreases as outputs from the ML model 1008 increasingly approximate the desired output. In other words, ANN infers the mapping implied by the training data, and the error/loss function produces an error value related to the mismatch between the desired output and the outputs from the ML model 1008 that are produced as a result of applying the training data 1002 to the ML model 1008.

Alternatively, for unsupervised learning or semi-supervised learning, training data 1002 is applied to train the ML model 1008. For example, the ML model 1008 can be an artificial neural network (ANN) that is trained via unsupervised or self-supervised learning using a backpropagation technique to train the weighting parameters between nodes within respective layers of the ANN.

In unsupervised learning, the training data 1002 is applied as an input to the ML model 1008, and an error/loss function is generated by comparing the predictions of the next program event in a sequence of events from the ML model 1008 with the actual next event in the event sequence. The coefficients of the ML model 1008 can be iteratively updated to reduce an error/loss function. The value of the error/loss function decreases as outputs from the ML model 1008 increasingly approximate the training data 1002.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, nonparametric methods and particle swarm optimization, can also be used for training the ML model 1008.

The training step 1004 for training the ML model 1008 can also include various techniques to prevent overfitting to the training data 1002 and for validating the trained ML model 1008. For example, bootstrapping and random sampling of the training data 1002 can be used during training.

Further, other machine learning (ML) algorithms can be used for the ML model 1008, and the ML model 1008 is not limited to being an ANN. For example, there are many machine-learning models, and the ML model 1008 can be based on machine-learning systems that include generative adversarial networks (GANs) that are trained, For example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwisc Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For example, ML model 1008 can be a transformer neural network that uses a sequence of events to predict the next event generated by a program. The ML model 1008 can use a transformer architecture such as a Bidirectional Encoder Representations from Transformer (BERT) and a Generative Pre-trained Transformer (GPT). The transformer architecture can use an input embedding block to provide representations for event sequences of network data. According to certain non-limiting examples, the representation is a real-valued vector that encodes the meaning of the word in such a way that words that are closer in the vector space are expected to be related events. Event embeddings can be obtained using modeling and feature learning techniques, where event sequences of the network data are mapped to vectors of real numbers. According to certain non-limiting examples, the input embedding block can be learned embeddings to convert the input tokens and output tokens to vectors that have the same dimension as the positional encodings, for example.

The positional encodings provide information about the relative or absolute position of the tokens in the sequence. According to certain non-limiting examples, the positional encodings can be provided by adding positional encodings to the input embeddings at the inputs to the encoder 7 and decoder. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, cach dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

The encoder uses stacked self-attention and point-wise, fully connected layers. The encoder can be a stack of N identical layers (e.g., N=6), and each layer is an encode block, as illustrated by encode block. Each encode block can have two sub-layers: (i) a first sub-layer has a multi-head attention encode block and (ii) a second sub-layer has a feed forward add & norm block, which can be a position-wise fully connected feed-forward network. The feed forward add & norm block can use a rectified linear unit (ReLU).

The encoder can uses a residual connection around each of the two sub-layers, followed by an add & norm multi-head attention block, which performs normalization (e.g., the output of each sub-layer is LayerNorm (x+Sublayer(x)), i.e., the product of a layer normalization "LayerNorm" time the sum of the input "x" and output "Sublayer(x)" pf the sublayer LayerNorm (x+Sublayer(x)), where Sublayer (x) is the function implemented by the sub-layer). To facilitate these residual connections, all sub-layers in the model, as well as the embedding layers, produce output data having the same dimension.

Similarly, the decoder uses stacked self-attention and point-wise, fully connected layers. For example, the decoder can also be a stack of M identical layers (e.g., M=6), and each layer is a decode block 714. In addition to the two sub-layers (i.e., the sublayer with the multi-head attention encode block and the sub-layer with the feed forward add & norm block), the decode block can include a third sub-layer, which performs multi-head attention over the output of the encoder stack. Like the encoder, the decoder can use residual connections around each of the sub-layers, followed by layer normalization. Additionally, the sub-layer with the multi-head attention encode block can be modified in the decoder stack to prevent positions from attending to subsequent positions. This masking, combined with fact that the output embeddings are offset by one position, ensures that the predictions for position "i" can depend only on the known output data at positions less than "i".

The linear block can be a learned linear transfor-mation. For example, when the transformer architecture is used to predict the next event in the network data, and the linear block projects the output from the last decode block into event scores representing likelihoods of the next event in the network data, which enables detecting anomalous behavior corresponding to a lower trust score. For instance, if there are 10,000 possible next events, then 10,000 score values are generated. If there three next events are predicted (i.e., event(N), event(N+1), and event(N+2)), the 10,000 score values would be generated for each position, i.e., each of event(N), event(N+1), and event(N+2). The score values indicate the likelihood of occurrence for each event in the vocabulary of events in that position of the event sequence.

A softmax block can be applied to the scores from the linear block to generate output probabilities (which add up to 1.0). In each position, the index provides for the event with the highest probability, and then map that index to the corresponding word in the vocabulary (e.g., a likelihood indicating whether the next value in the network data indicates a normal or an anomalous behavior). Those events then form the output sequence of the transformer architec-ture. The softmax operation is applied to the output from the linear block to convert the raw numbers into the output probabilities (e.g., token probabilities).

Figure 10B:
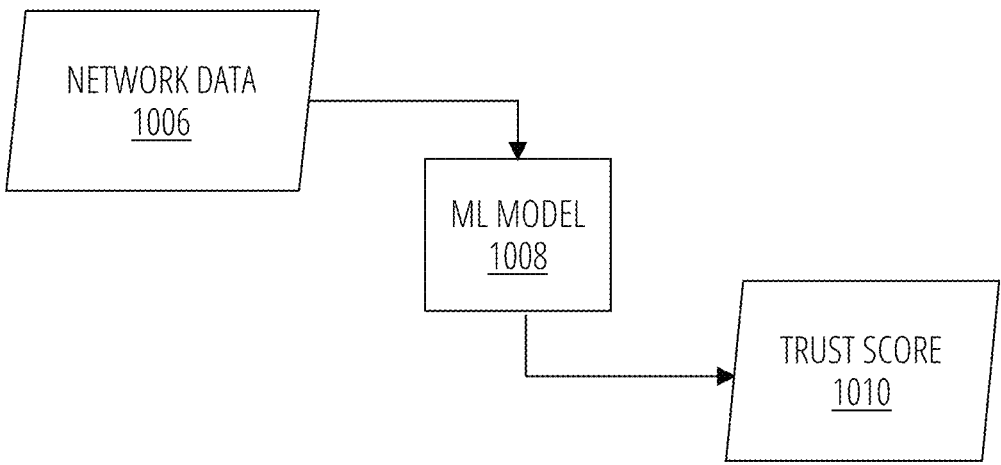
FIG. 10B illustrates a block diagram of an example of using the trained ML model to determine trust scores, in accordance with some embodiments.

FIG. 10B illustrates an example of using the trained ML model 1008. The network data 1006 is applied to the trained ML model 1008 to generate various outputs, which can include the trust score 1010.

Figure 11:
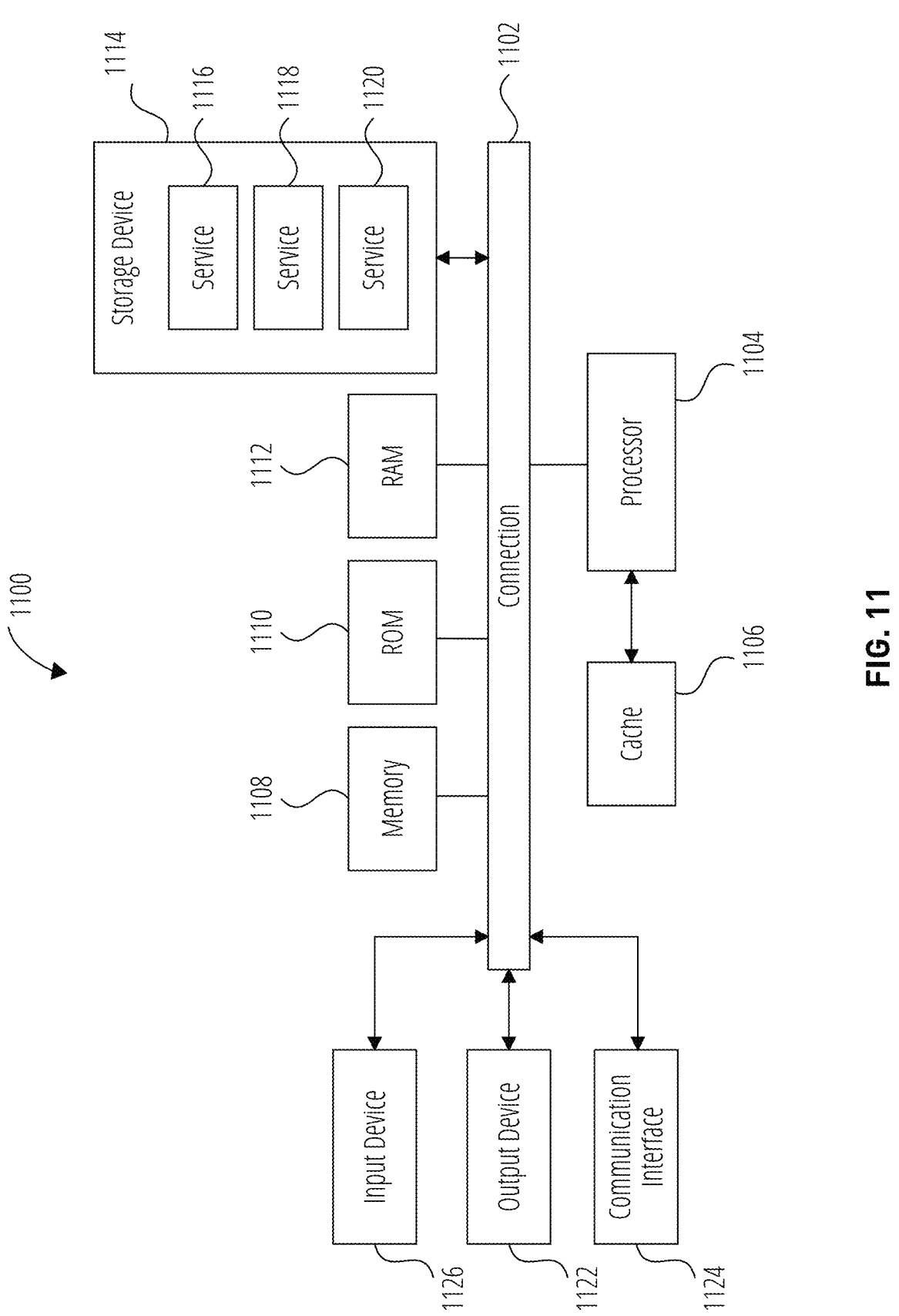
FIG. 11 illustrates a block diagram of an example of a computing device, in accordance with some embodiments.

FIG. 11 shows an example of computing system 1100, which can be for example any computing device making up system 400, internet edge security framework 500, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a dis-tributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) processor 1104 and connection 1102 that couples various system components including system memory 1108, such as read-only memory (ROM) 1110 and random access memory (RAM) 1112 to processor 1104. Computing system 1100 can include a cache of high-speed memory cache 1106 connected directly with, in close proximity to, or integrated as part of processor 1104.

Processor 1104 can include any general-purpose proces-sor and a hardware service or software service, such as service 1116, service 1118, and service 1120 stored in storage device 1114, configured to control processor 1104 as well as a special-purpose processor where software instruc-tions are incorporated into the actual processor design. Processor 1104 may essentially be a completely self-con-tained computing system, containing multiple cores or pro-cessors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Comput-ing system 1100 can also include output device 1122, which can be one or more of a number of output mechanisms known to those of skill in the art. In some instances, multimodal systems can enable a user to provide multiple types of input/output to communicate with computing sys-tem 1100. Computing system 1100 can include communi-cation interface 1124, which can generally govern and manage the user input and system output. There is no restriction on operating on any particular hardware arrange-ment, and therefore the basic features here may easily be substituted for improved hardware or firmware arrange-ments as they are developed.

Storage device 1114 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-read-able medium in connection with the necessary hardware components, such as processor 1104, connection 1102, out-put device 1122, etc., to carry out the function.

For clarity of explanation, in some instances, the present technology may be presented as including individual func-tional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general-purpose computer, special-purpose computer, or special-purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of optimizing a distributed security fabric, the method comprising:

receiving, at a controller, respective security policies being implemented in a network comprising enforcement points at respective nodes within the network;

determining, by the controller, selected enforcement points within the network at which the respective security policies are applied;

sending, to the selected enforcement points, instructions to apply the security policies at the selected enforcement points, respectively; and determining one or more changes to be applied to the security policies based on continuous monitoring of data flows through the network, wherein the selected enforcement points are determined based on an estimated flow cost representing an aggregation of consumed resources at the selected enforcement points that is determined based on a topology of the network, and the one or more changes are automatically applied based on a corresponding score associated with the one or more changes.

2. The method of claim 1, wherein the selected enforcement points are selected from firewall enforcement points within a distributed firewall and security hook enforcement points applied at one or more endpoints of the network.

3. The method of claim 1, wherein the estimated flow cost is an objective function that accounts for changes in an amount of computational resources used to apply the security policies resulting from how the security policies are segmented and where the security policies are placed within the network.

4. The method of claim 1, further comprising:

modifying the security policies in accordance with the one or more changes.

5. The method of claim 1, wherein determining the one or more changes to the security policies further comprises:

applying network data to a machine-learning model to output recommended changes, the network data corresponding to the data flows through the network.

6. The method of claim 5, wherein:

each of the recommended changes respectively include the corresponding score, for a score that corresponds to a recommended change, the recommended change is implemented automatically when the score is in a first range, the recommended change being one of the one or more changes, when the score is in a second range, the recommended change is signaled to an authorized user to be implemented manually, when the authorized user takes an action with respect to the recommended change, the action is used to label the recommended change to generate labeled training data that is added to a training data set, and the machine-learning model is trained using the training data set for reinforcement learning.

7. The method of claim 5, wherein the machine-learning model is an unsupervised learning model that groups data packets of the data flows into clusters and identifies data packets outside the clusters as suspicious.

8. The method of claim 5, wherein the machine-learning model predicts suspicious packets from the network data and determines the one or more changes to the security policies based on the suspicious packets.

9. The method of claim 5, wherein:

the machine-learning model is a generative adversarial network model that includes a generator model and a discriminator model, the generator model is trained to generate data packets that are consistent with allowed packets, the discriminator model is trained to discriminate the allowed packets from not allowed packets, and ingress packets that are detected by the discriminator model as the not allowed packets are flagged as suspicious packets and used for determining the one or more changes to the security policies, the machine-learning model is a latent variable model that determines the suspicious packets based on a distance measure between an input packet and output packet, wherein the output packet is generated by applying the input packet to the latent variable model, or the machine-learning model is a transformer model that determines the suspicious packets by predicting, based on the network data, whether a data packet is suspicious.

10. The method of claim 1, further comprising:

analyzing the security policies to determine redundancies and/or inefficiencies among the security policies;

modifying the security policies to mitigate the redundancies and/or the inefficiencies; and validating the security policies to confirm that modifying the security policies maintains an effectiveness of the security policies.

11. The method of claim 1, wherein the security policies include 5-tuple rules dictating actions taken on a data packet based on a 5-tuple that includes a source address of the data packet, a source port of the data packet, a destination address of the data packet, a destination port of the data packet, and a protocol of the data packet.

12. The method of claim 11, wherein the security policies further include IPS signature detection, deep packet inspection, authentication, an access list, HTTP or HTTPS filtering, or an advanced inspection and prevention security operation module.

13. A computing apparatus comprising:

a processor; and a memory storing instructions that, when executed by the processor, configure the computing apparatus to:

receive, at a controller, security policies being implemented in a network comprising enforcement points at respective nodes within the network;

determine, by the controller, selected enforcement points within the network at which the respective security policies are applied;

send, to the selected enforcement points, instructions to apply the security policies at the selected enforcement points, respectively; and determine one or more changes to be applied to the security policies based on continuous monitoring of data flows through the network, wherein the selected enforcement points are determined based on an estimated flow cost representing an aggregation of consumed resources at the selected enforcement points that is determined based on a topology of the network, and the one or more changes are automatically applied based on a corresponding score associated with the one or more changes.

14. The computing apparatus of claim 13, wherein the selected enforcement points are selected from firewall enforcement points within a distributed firewall and security hook enforcement points applied at one or more endpoints of the network.

15. The computing apparatus of claim 13, wherein, when executed by the processor, the instructions that are stored in the memory further configure the computing apparatus to:

modify the security policies in accordance with the one or more changes.

16. The computing apparatus of claim 13, wherein, when executed by the processor, the instructions determine the one or more changes to the security policies by further configuring the computing apparatus to:

apply network data to a machine-learning model to output recommended changes, the network data corresponding to the data flows through the network.

17. The computing apparatus of claim 16, wherein each of the recommended changes respectively include the corresponding score, scores, for a score that corresponds to a recommended change, the recommended change is implemented automatically when the score is in a first range, the recommended change being one of the one or more changes, when the score is in a second range, the recommended change is signaled to an authorized user to be implemented manually, when the authorized user takes an action with respect to the recommended change, the action is used to label the recommended change to generate labeled training data that is added to a training data set, and the machine-learning model is trained using the training data set for reinforcement learning.

18. The computing apparatus of claim 16, wherein the machine-learning model is an unsupervised learning model that groups data packets of the data flows into clusters and identifies data packets outside the clusters as suspicious;

the machine-learning model is a generative adversarial network model that includes a generator model and a discriminator model, the generator model being trained to generate data packets that are consistent with allowed packets, the discriminator model being trained to discriminate the allowed packets from not allowed packets, and ingress packets that are detected by the discriminator model as the not allowed packets are flagged as suspicious packets and used for determining the one or more changes to the security policies, the machine-learning model is a latent variable model that determines the suspicious packets based on a distance measure between an input packet and output packet, wherein the output packet is generated by applying the input packet to the latent variable model, or the machine-learning model is a transformer model that determines the suspicious packets by predicting, based on the network data, whether a data packet is suspicious.

19. The computing apparatus of claim 13, wherein the security policies include 5-tuple rules dictating actions taken on a data packet based on a 5-tuple that includes a source address of the data packet, a source port of the data packet, a destination address of the data packet, a destination port of the data packet, and a protocol of the data packet.

20. A non-transitory computer-readable storage medium including instructions that when executed by a computer, cause the computer to:

receive, at a controller, security policies being implemented in a network;

determine, by the controller, selected enforcement points within the network where the security policies are applied;

send, to the selected enforcement points, instructions to apply the security policies at the selected enforcement points, respectively; and determine one or more changes to be applied to the security policies based on continuous monitoring of data flows through the network, wherein the selected enforcement points are determined based on an estimated flow cost representing an aggregation of consumed resources at the selected enforcement points that is determined based on a topology of the network, and the one or more changes are automatically applied based on a corresponding score associated with the one or more changes.

* * * * *